(12) United States Patent
Willnow et al.

(10) Patent No.: US 12,397,717 B2
(45) Date of Patent: Aug. 26, 2025

(54) LADDER RACK WITH REDUCIBLE WIDTH AND/OR HEIGHT

(71) Applicant: Adrian Steel Company, Adrian, MI (US)

(72) Inventors: Elizabeth Elaine Willnow, Adrian, MI (US); Mark Anthoney Henry, Jr., Adrian, MI (US); Joshua Michael Gerez, Tecumseh, MI (US); Robert Michael Butcher, Saint Charles, MI (US); Joshua Merle Rogers, Adrian, MI (US); Joshua James Parker, Adrian, MI (US); Peter Francis Rowlson, Addison, MI (US); Benjamin Burke, Britton, MI (US); Zachary Burk, Adrian, MI (US)

(73) Assignee: Adrian Steel Company, Adrian, MI (US)

( * ) Notice: Subject to any disclaimer, the term of this patent is extended or adjusted under 35 U.S.C. 154(b) by 313 days.

(21) Appl. No.: 18/162,922

(22) Filed: Feb. 1, 2023

(65) Prior Publication Data

US 2023/0249626 A1 Aug. 10, 2023

Related U.S. Application Data

(60) Provisional application No. 63/267,624, filed on Feb. 7, 2022.

(51) Int. Cl.
*B60R 9/042* (2006.01)
*B60R 9/045* (2006.01)
*B60R 9/048* (2006.01)

(52) U.S. Cl.
CPC ............ *B60R 9/0423* (2013.01); *B60R 9/045* (2013.01); *B60R 9/0485* (2013.01)

(58) Field of Classification Search
CPC ......... B60R 9/04; B60R 9/0423; B60R 9/045; B60R 9/0485
USPC ......................................................... 296/3, 7
See application file for complete search history.

(56) References Cited

U.S. PATENT DOCUMENTS

| | | |
|---|---|---|
| 2,551,351 A | 5/1951 | Swenson |
| 3,460,694 A | 8/1969 | Simms |
| 3,480,166 A | 11/1969 | Abbott |
| 3,677,451 A | 7/1972 | Burland |
| 3,776,437 A | 12/1973 | Carney |

(Continued)

FOREIGN PATENT DOCUMENTS

| | | |
|---|---|---|
| CA | 2151681 A1 | 12/1996 |
| EP | 2551151 B1 | 12/2016 |

(Continued)

*Primary Examiner* — Jason S Daniels
(74) *Attorney, Agent, or Firm* — Marshall & Melhorn, LLC

(57) ABSTRACT

A slide assembly for a ladder rack may be adapted to selectively move with respect to a roof bow rail. The assembly may have first and second slide walls connected together by an intermediate rail slide wall and at least one fastener, where the at least one fastener may be adapted to be slidably received within the roof bow rail. The assembly may also have a support flange connected to the second rail slide wall. The assembly may also have a housing connected to the support flange, where a retention tube is rotatably mounted within the housing. A first gripper member may be connected to the retention tube for selective movement therewith.

17 Claims, 14 Drawing Sheets

(56) References Cited

U.S. PATENT DOCUMENTS

| | | | |
|---|---|---|---|
| 4,081,095 A | 3/1978 | Wilburn et al. | |
| 4,616,771 A | 10/1986 | Heideman | |
| 4,618,083 A * | 10/1986 | Weger, Jr. | B60R 9/0485 224/324 |
| 5,058,791 A | 10/1991 | Henriquez et al. | |
| 5,297,912 A | 3/1994 | Levi | |
| 5,398,778 A | 3/1995 | Sexton | |
| 5,464,140 A | 11/1995 | Hill | |
| 5,848,743 A | 12/1998 | Derecktor | |
| 5,884,824 A | 3/1999 | Spring, Jr. | |
| 6,010,048 A | 1/2000 | Settelmayer | |
| 6,015,074 A | 1/2000 | Snavely et al. | |
| 6,050,467 A | 4/2000 | Drouillard et al. | |
| 6,105,840 A | 8/2000 | Trevino et al. | |
| 6,158,638 A | 12/2000 | Szigeti | |
| 6,315,181 B1 | 11/2001 | Bradley et al. | |
| 6,357,643 B1 | 3/2002 | Janner et al. | |
| 6,360,930 B1 | 3/2002 | Flickenger | |
| 6,428,263 B1 | 8/2002 | Schellens | |
| 6,446,850 B2 | 9/2002 | Ming-Shun | |
| 6,681,970 B2 | 1/2004 | Byrnes | |
| 6,854,627 B2 | 2/2005 | Foo et al. | |
| 7,014,236 B2 | 3/2006 | Kerns | |
| 7,097,409 B2 | 8/2006 | Richter | |
| 7,401,715 B2 | 7/2008 | Edgerly | |
| 7,549,831 B2 | 6/2009 | Hendley et al. | |
| 7,922,242 B2 | 4/2011 | Comfort et al. | |
| 8,113,397 B2 | 2/2012 | Magnusson | |
| 8,136,709 B2 | 3/2012 | Jeli et al. | |
| 8,210,407 B2 | 7/2012 | Sautter et al. | |
| 8,534,517 B2 | 9/2013 | Binder et al. | |
| 8,915,411 B2 | 12/2014 | Steckel | |
| 8,974,160 B2 | 3/2015 | Bender | |
| 9,132,780 B2 | 9/2015 | Sautter, Jr. et al. | |
| 9,187,047 B2 | 11/2015 | Sautter et al. | |
| 9,193,304 B2 | 11/2015 | Svaldi et al. | |
| 9,308,872 B2 | 4/2016 | Huhn et al. | |
| 9,327,654 B2 | 5/2016 | Richter et al. | |
| 9,346,409 B2 | 5/2016 | Pfaeffli | |
| 9,371,040 B2 | 6/2016 | Townsend | |
| 9,371,041 B2 | 6/2016 | Almhill et al. | |
| 9,381,866 B2 | 7/2016 | Sautter et al. | |
| 9,409,527 B2 | 8/2016 | Hubbard | |
| 9,415,726 B2 * | 8/2016 | Levi | B60R 9/0485 |
| 9,440,520 B2 | 9/2016 | Rohr et al. | |
| 9,457,727 B2 | 10/2016 | Hobbs | |
| 9,481,313 B2 * | 11/2016 | Levi | B60R 9/0485 |
| 9,566,913 B2 | 2/2017 | Sarges et al. | |
| 9,586,629 B2 | 3/2017 | Leitner | |
| 9,630,565 B2 | 4/2017 | Gallagher | |
| 9,694,756 B2 | 7/2017 | Pullman et al. | |
| 9,783,119 B1 | 10/2017 | Lachance et al. | |
| 10,000,114 B2 | 6/2018 | Rohr et al. | |
| 10,005,403 B2 | 6/2018 | Calvin | |
| 10,017,124 B2 | 7/2018 | Lachance et al. | |
| 10,112,549 B2 | 10/2018 | Sutton | |
| 10,160,394 B2 | 12/2018 | Kraeuter et al. | |
| 10,189,417 B1 | 1/2019 | Morken | |
| 10,189,418 B2 | 1/2019 | Willis | |
| 10,207,650 B1 | 2/2019 | Banegas | |
| 10,259,508 B2 | 4/2019 | Leitner | |
| 10,406,987 B1 | 9/2019 | Lester | |
| 10,442,363 B2 | 10/2019 | Ferman | |
| 10,562,460 B2 | 2/2020 | Forgette et al. | |
| 10,604,057 B2 | 3/2020 | Gettel | |
| 10,647,262 B2 | 5/2020 | Müller et al. | |
| 10,710,511 B2 | 7/2020 | Lee et al. | |
| 10,766,427 B2 | 9/2020 | Livingston et al. | |
| 10,780,837 B2 | 9/2020 | Sautter et al. | |
| 10,793,200 B2 | 10/2020 | Leitner | |
| 10,814,793 B2 | 10/2020 | Harrell et al. | |
| 10,926,709 B2 | 2/2021 | Herriman et al. | |
| 11,299,104 B1 | 4/2022 | Syed et al. | |
| 11,377,160 B2 | 7/2022 | Leitner | |
| 2005/0236228 A1 | 10/2005 | Thibault | |
| 2006/0065685 A1 | 3/2006 | Fitzsimmons | |
| 2006/0185933 A1 | 8/2006 | Thibault | |
| 2006/0280583 A1 | 12/2006 | Prods | |
| 2009/0020573 A1 | 1/2009 | Binder et al. | |
| 2010/0038932 A1 | 2/2010 | Comfort et al. | |
| 2011/0214944 A1 | 9/2011 | Levi | |
| 2011/0290836 A1 | 12/2011 | Shen | |
| 2013/0020361 A1 | 1/2013 | Sautter et al. | |
| 2013/0062379 A1 | 3/2013 | Sautter et al. | |
| 2014/0124551 A1 | 5/2014 | Condon et al. | |
| 2015/0048127 A1 | 2/2015 | Sutton et al. | |
| 2016/0167590 A1 | 6/2016 | Sandberg et al. | |
| 2017/0341590 A1 | 11/2017 | McLauchlan | |
| 2018/0118127 A1 | 5/2018 | Wymore | |
| 2019/0077326 A1 | 3/2019 | Hawkins et al. | |
| 2019/0118726 A1 | 4/2019 | Wacker et al. | |
| 2019/0262880 A1 | 8/2019 | Wacker et al. | |
| 2020/0180515 A1 | 6/2020 | Dimmen et al. | |
| 2021/0061181 A1 | 3/2021 | Bica et al. | |
| 2021/0253033 A1 | 8/2021 | Gentili et al. | |
| 2022/0161732 A1 | 5/2022 | Keck, II | |

FOREIGN PATENT DOCUMENTS

| | | | |
|---|---|---|---|
| FR | 2673404 A1 * | 9/1992 | B60R 9/0423 |
| WO | 2014134712 A1 | 9/2014 | |
| WO | 2016133413 A1 | 8/2016 | |
| WO | 2017134480 A1 | 8/2017 | |

* cited by examiner

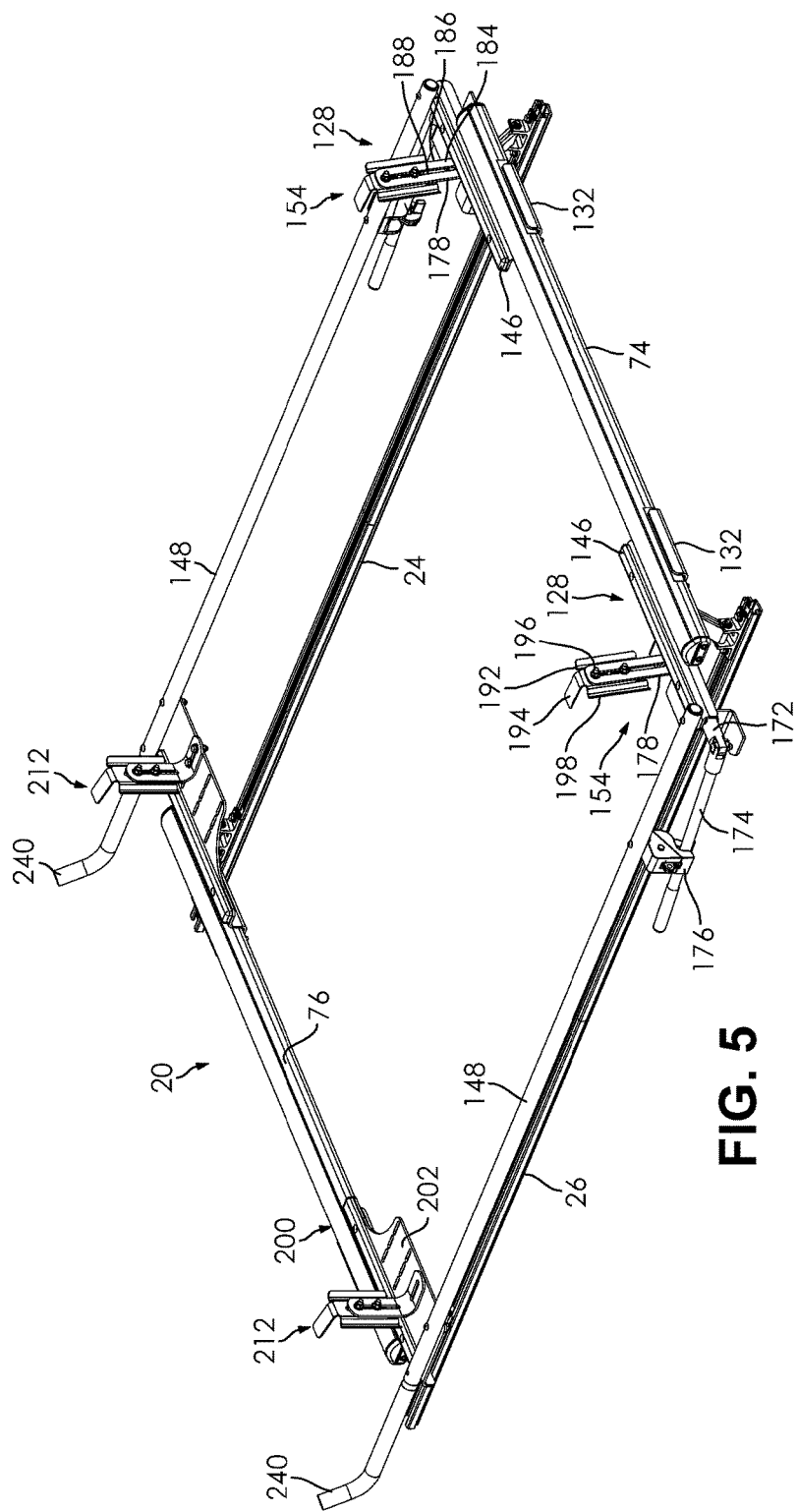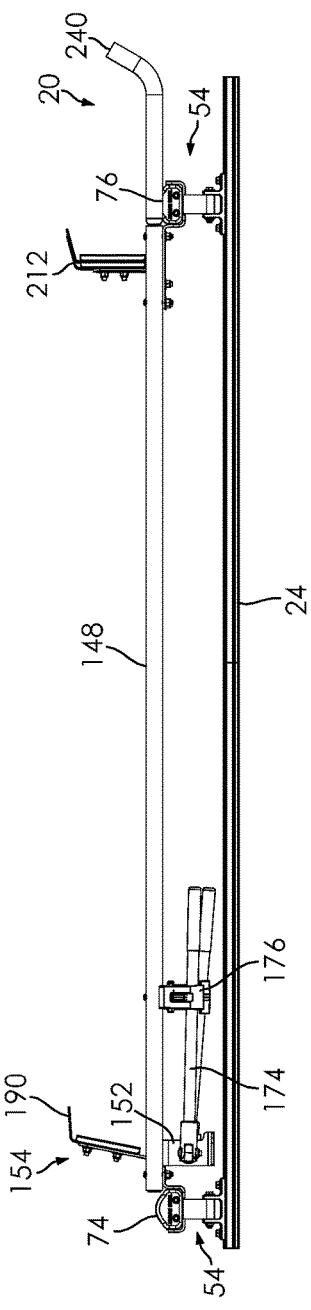
FIG. 5
FIG. 6

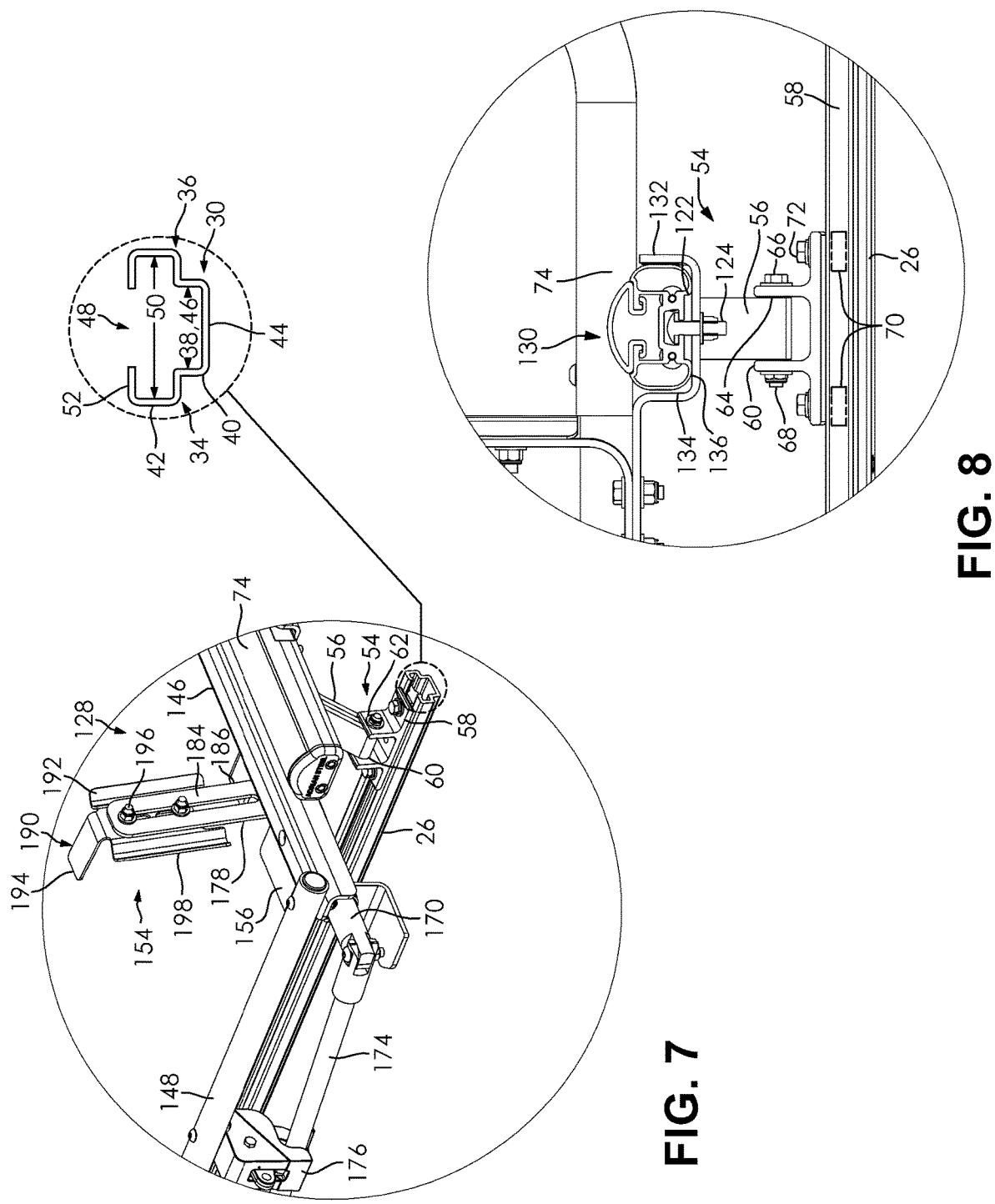

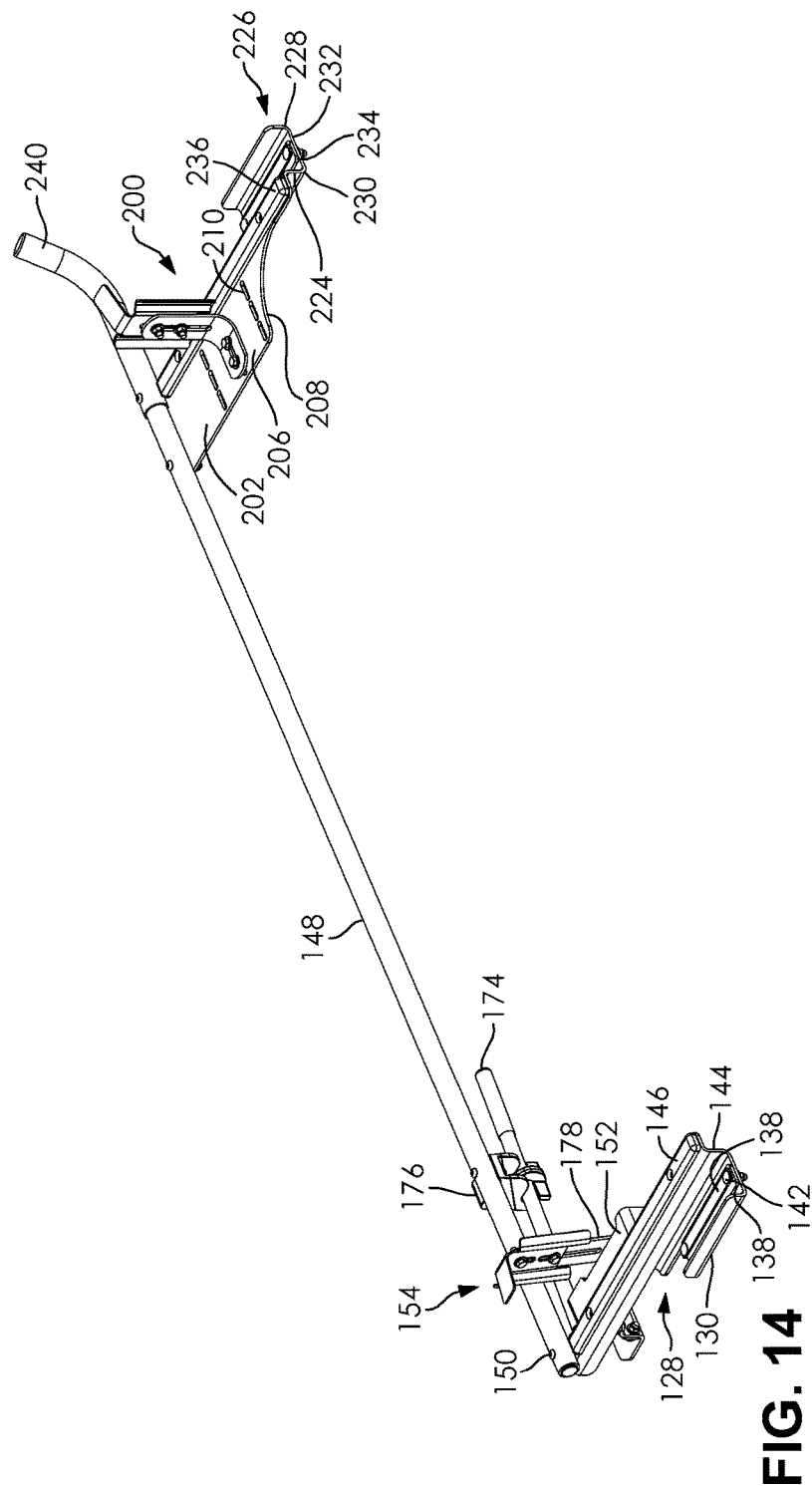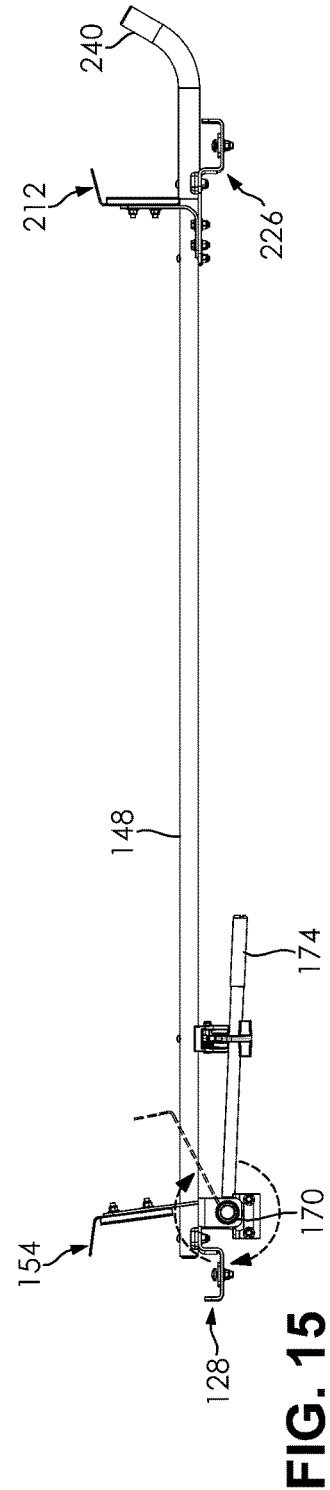

LADDER RACK WITH REDUCIBLE WIDTH AND/OR HEIGHT

FIELD

One embodiment of a vehicle mounted ladder rack with reducible width and/or height is described and depicted.

BACKGROUND

Ladder racks are devices used to store and transport equipment and ladders on the exterior, such as the roof, of a vehicle. In most cases, existing ladder racks have a fixed width across the vehicle. Further, the existing ladder racks have a fixed height above the vehicle. In other words, the existing ladder racks are designed to be installed on the roof of the vehicle in a fixed, ready-to-use condition.

A significant problem with the prior art racks is that when they are installed on a vehicle, the combined vehicle and rack make further transportation very difficult. For example, a vehicle with a rack installed on its roof will not fit in a standard size railroad car, which is the preferred mode of transportation of the combined rack and vehicle. One reason for this is that most standard size railroad cars have a sloped, or rounded roof. This roof style reduces the available space within the rail car and a vehicle with a roof rack will not fit. In these cases, the rack must be installed after the vehicle is shipped which can, at a minimum, add cost to the system and increase the time it takes for the system to be provided to the end user.

In view of the problems associated with the prior art racks, it would be advantageous for a ladder rack to selectively adapt to reduce width and/or height requirements so that transportation of the combined rack and vehicle can be accomplished.

SUMMARY

In one aspect a ladder rack may have a first slide assembly adapted to selectively move with respect to a first bow. The first slide assembly may have first and second slide walls connected together by an intermediate bow slide wall. At least one of a channel bar and a fastener bar may be connected to the intermediate bow slide wall by at least one fastener. The at least one fastener may be adapted to be slidably received within the first bow. The first slide assembly may also have a support flange connected to the second bow slide wall. The first slide assembly may also have a housing connected to the support flange. A retention tube may be rotatably mounted within the housing. The rack may also have a first gripper member connected to the retention tube for selective movement therewith. The rack may also have a second slide assembly adapted to selectively move with respect to a second bow. The second slide assembly may have first and second slide walls connected together by an intermediate bow slide wall. At least one of a channel bar and a fastener bar are connected to the intermediate bow slide wall by at least one fastener. At least one fastener may be adapted to be slidably received within the second bow. The second slide assembly may also have a gripper platform slide connected to the second bow slide wall. The second slide assembly may also have a second gripper member removably connected to the gripper platform slide. The rack may also have a side tube having one end portion connected to the support flange and a second end portion connected to the gripper platform slide.

In another aspect, the rack may further comprise a carriage and a slide tube where the carriage is selectively movable along the side tube and the slide tube.

In another aspect, the carriage has an upper surface with a side tube housing for receiving the side tube therein and two slide tube housings on a lower surface for receiving the slide tube therein.

In another aspect, the upper surface of the carriage is substantially coplanar with an upper surface of the support bar and an upper surface of the gripper platform slide.

In another aspect, the housing comprises substantially parallel first and second legs connected by a transverse upper portion.

In another aspect, the gripper member is attached to a rear surface of a pivot member and the rear surface is attached to the retention tube.

In another aspect a slide assembly for a ladder rack may have been first and second substantially parallel slide walls connected together by an intermediate, transverse bow slide wall, wherein at least one of a channel bar and a fastener bar may be connected to the intermediate bow slide wall by at least one fastener, wherein the at least one fastener is adapted to be slidably received within a bow. The assembly may also have a support flange connected to the second bow slide wall. The assembly may also have a housing connected to the support flange, wherein a retention tube is rotatably mounted within the housing. The assembly may also have a gripper member is connected to the retention tube for selective movement therewith.

In another aspect, the channel bar and the fastener bar may be rectangular bars, wherein the fastener bar may have a smaller width compared to the fastener bar and wherein fasteners may extend through end portions of both bars and into the intermediate rail slide wall.

In another aspect, the support flange may be substantially parallel but not coplanar with the intermediate bow slide wall.

In another aspect, the housing comprises substantially parallel first and second legs connected by a transverse upper portion.

In another aspect, the gripper member may be attached to a rear surface of a pivot member and the rear surface is attached to the retention tube.

In another aspect, the retention tube may extend substantially parallel at least one of the channel bar and the fastener bar.

In another aspect, a ladder rack may have a first slide assembly having first and second slide walls connected together by an intermediate bow slide wall, wherein the walls may be adapted to selectively slide along a first bow. The first slide assembly may also have a support flange connected to the second rail slide wall. The first slide assembly may also have a housing connected to the support flange, wherein a retention tube is rotatably mounted within the housing. The first slide assembly may also have a first gripper member is connected to the retention tube for selective movement therewith. The rack may also have a second slide assembly having first and second slide walls connected together by an intermediate bow slide wall, wherein the walls may be adapted to selectively slide along a second bow. The second slide assembly may also have a gripper platform slide connected to the second bow slide wall. The second slide assembly may also have a second gripper member removably connected to the gripper platform slide. The rack may also have a side tube having a first end portion connected to the support flange and a second end portion connected to the gripper platform slide. The rack may also have a slide tube having a first end portion connected to the support flange and a second end connected to the gripper platform slide. The rack may also have a carriage having at least one slide tube housing and a side tube housing wherein the housings slidably receive the slide tube and the side tube therein, wherein the carriage may extend between the tubes and selectively moves along the tubes.

In another aspect, the side tube and slide tube may extend substantially parallel and coplanar one another.

In another aspect, a gripper portion and a ladder flange may be removably mounted to an upper surface of the carriage.

In another aspect, two slide tube housings may be located on a lower surface of the carriage and the side tube housing is located on an upper surface of the carriage.

In another aspect, the upper surface of the carriage may be substantially coplanar with an upper surface of the support bar and an upper surface of the gripper platform slide.

BRIEF DESCRIPTION OF THE DRAWINGS

The above, as well as other advantages, will become readily apparent to those skilled in the art from the following detailed description when considered in the light of the accompanying drawings in which:

FIG. 5 is another schematic upper perspective view of the system from FIG. 5;

FIG. 6 is a schematic side view of a portion of the system;

FIG. 7 is a schematic partial upper perspective view of components of the system;

FIG. 8 is a schematic cross-sectional end view of certain components of the system;

FIG. 14 is a schematic upper perspective view of a portion of the system;

FIG. 15 is a side view of the system in FIG. 14;

DETAILED DESCRIPTION OF THE PREFERRED EMBODIMENTS

It is to be understood that the device described herein may assume various alternative orientations and step sequences, except where expressly specified to the contrary. It is also to be understood that the specific devices and processes illustrated in the attached drawings, and described in the following specification are simply exemplary embodiments of the concepts herein. Hence, specific dimensions, directions or other physical characteristics relating to the embodiments disclosed are not to be considered as limiting.

Figure 1:
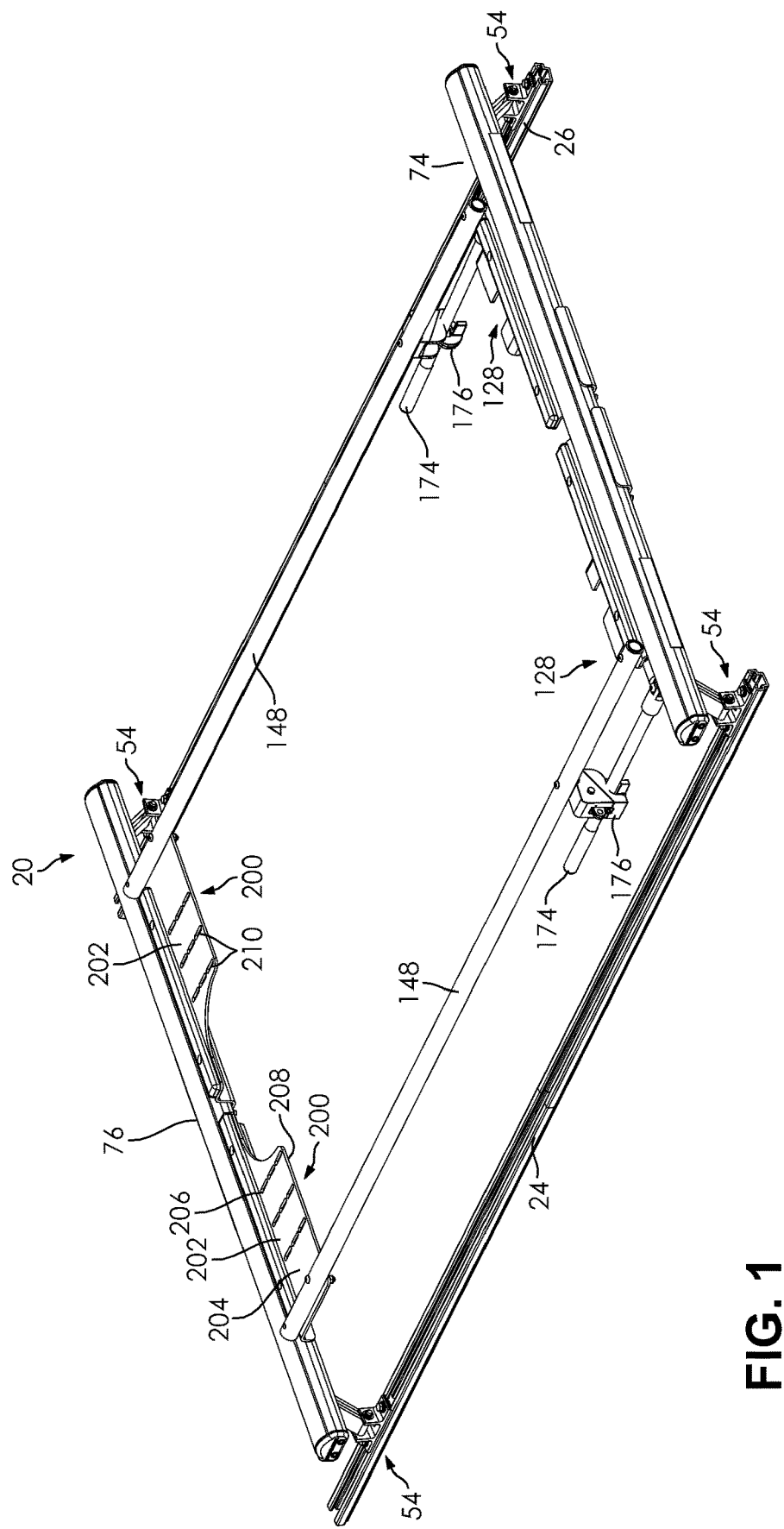
FIG. 1 is a schematic upper perspective view of one embodiment of a roof rack system for a vehicle in a ship through condition.
Figure 2:
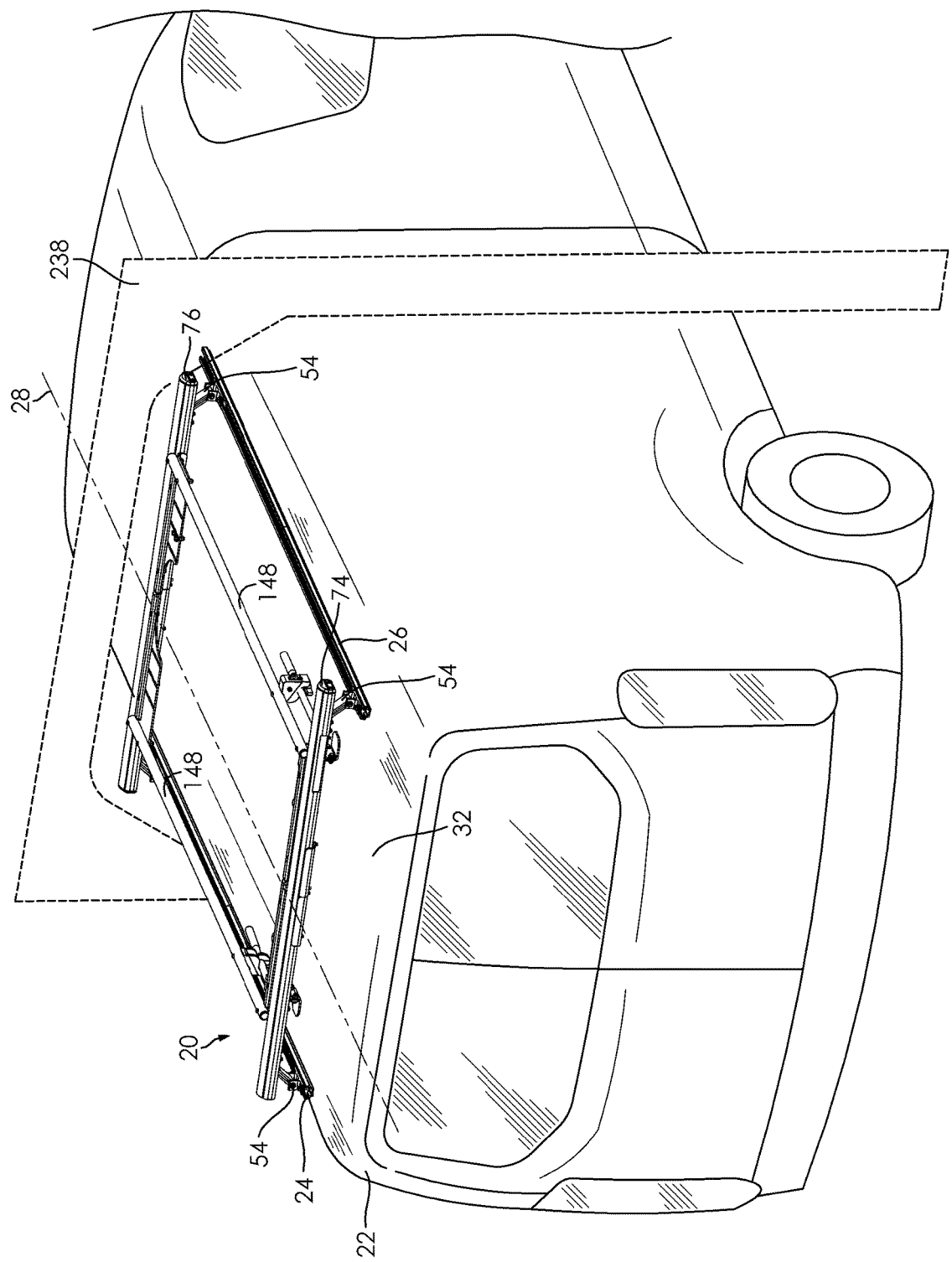
FIG. 2 is a schematic perspective view of the roof rack system of FIG. 1 located on one embodiment of a vehicle with an outline of a rail car opening.
Figure 3:
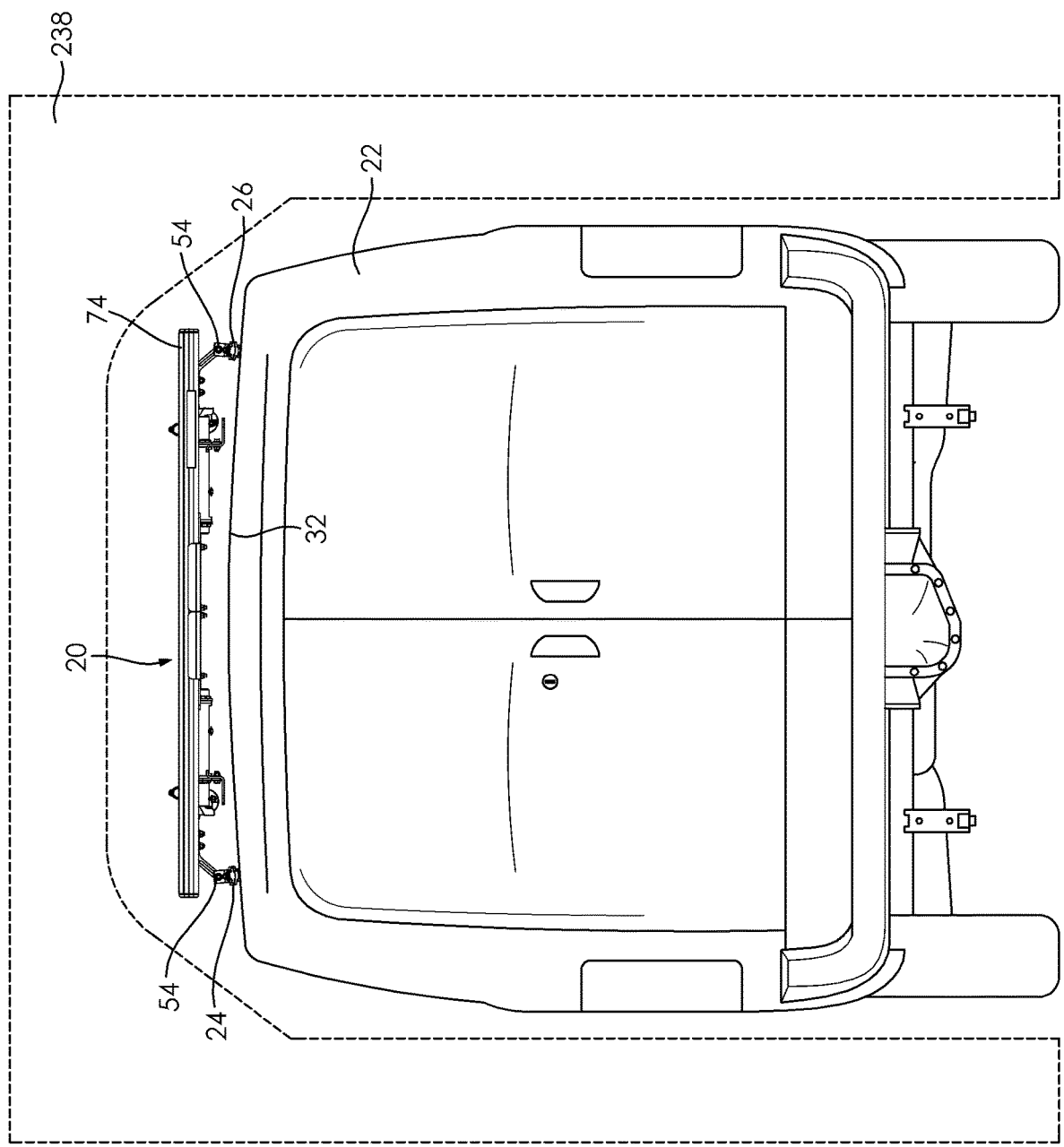
FIG. 3 is a schematic rear view of the roof rack system, the vehicle and the rail car opening from FIG. 2.

Turning now to at least FIGS. 1-3, one embodiment of a roof rack system 20 in a retracted, or ship through condition, adapted for use with a vehicle 22 is schematically depicted. The vehicle 22 may be such as a cargo van type vehicle 22, but the system 20 may be used with other vehicles and it is not limited to cargo van type vehicles 22.

In some embodiments, the system 20 may be comprised of a first and second rail 24, 26. The rails 24, 26 may be the same or they may different in shape, size and/or materials. In the depicted exemplary embodiment, the rails 24, 26 may be substantially the same. The rails 24, 26 may be positioned generally parallel and spaced apart from one another. In some embodiments the rails 24, 26 may be parallel with a longitudinal axis 28 of the vehicle 22.

The rails 24, 26 may have a general C-shaped cross section with a lower portion comprising an attachment portion 30. The attachment portion 30 may be located on a substrate, such as the exterior roof surface 32 of the vehicle 22, which can be seen from FIGS. 2 and 3. The rails 24, 26 may be connected to the substrate through mechanical fasteners, welding, adhesives, and/or they may be integrally formed therewith.

The C-shape may be further formed by first and second upstanding flanges 34, 36 separated from one another by the lower portion 30 so that a gap 38 is located between the flanges 34, 36. Each upstanding flange 34, 36 may have a first portion 40 and a second portion 42.

Each first portion 40 may be directly connected to the lower portion 30 and extend therefrom such as at an angle, including a generally transverse angle with respect to the lower portion 30. Each first portion 40, along with the lower portion 30, may define a first channel 44. The first channel 44, defined by the first portions 40 and the lower portion 30, may extend substantially continuously along the rails 24, 26 at a substantially constant first width 46.

Each second portion 42 may be directly connected to the respective first portion 40, such as to a top portion of the first portion 40, and extend therefrom, such as at an angle including a generally transverse angle with respect to the lower portion 30. Each second portion 42 may define a second channel 48. The second channel 48, defined by the second portions 42, may extend substantially continuously along the rails 24, 26 at a substantially constant, second width 50 that is greater than the first width 46. Each second portion 42 may have an inwardly extending lip 52 in a generally transverse direction to the second portion 42. The lips 52 may extend to at least partially enclose the second channel 48.

The rail channels 44, 48 may be adapted to receive at least one roof bow mounting portion 54 therein. In one embodiment, the mounting portion 54 may be comprised of a riser 56. In some embodiments, the riser 56 may be comprised of two parallel sections of material that are separated from one another by a gap. The riser 56 may be located at an acute angle (viewed along the longitudinal direction of the vehicle), but other angles may be permissible. In other embodiments, the riser 56 may be a single piece that may or may not be located at an acute angle.

The roof bow mounting portion 54 may also be comprised of a base portion 58. The base portion 58 may be selectively pivotable with respect to the riser 56. The base portion 58 may have two upstanding ears 60 with aligned apertures 62 extending through the ears 60. The riser 56 may also have an aperture 64 extending therethrough, which may be adapted to align with the ear apertures 62. A fastener 66 may extend through the ear apertures 62 and the riser aperture 64. A nut 68 may be located on one end of the fastener 66 extending through one of the ears 60 to fix the fastener 66 in the apertures 62, 64 and secure the base portion 58 position with respect to the riser 56. The nut 68 may be loosened, the base portion 58 pivoted at a desired angle with respect to the riser 56, and then the nut 68 may be tightened to secure the base portion 58 at the desired angle to the riser 56. In this way, the base portion 58 may be adjusted to match the pitch or angle of the roof surface 32 of the vehicle 22, but each riser 52 attached to each base portion 58 may present a parallel surface for mounting roof bows thereto.

The base portion 58 may be sized and shaped to be slidably captured within at least the second channel 48. In other words, the base portion may selectively slide within at least the second channel 48, where it can be located in a desired portion along the rail 24, 26. Mechanical fasteners can be used to lock the base portion 58 to the rail 24, 26. The base portion 58 may also be similarly adapted to fit within the first channel 44.

In some embodiments, an insert 70 may be located with the first and/or second channel 44, 48 of the rail 24, 26. The insert 70 may be selectively slidable with the channel(s) 44, 48. Fasteners 72 may extend through the base portion 58 into the insert 70 to connect them. Further, the fasteners 72 may draw the insert 70 into locking engagement with the rail 24, 26 to lock the insert and the mounting portion 54 to the rail 24, 26.

The rails 24, 26 and the roof bow mounting portion 54 may be constructed of a robust material capable of withstanding harsh outdoor environments in which vehicles operate. In some embodiments, the rails 24, 26 and the roof bow mounting portions 54 may be constructed of the same material, but they may be constructed of different materials. Possible materials for the rails 24, 26 and the roof bow mounting portions 54 may include metals, plastics, polymers and/or composite materials. If constructed of metal the rails 24, 26 and mounting portions 54 may be such as extruded aluminum alloy.

The system 20 may also have at least one roof bow. In some embodiments, the system 20 may have a first and a second roof bow 74, 76. In other embodiments, the system 20 may have an additional roof bow as described in more detail below. The discussion below relates to the first roof bow 74, but it may apply to any of the other roof bows.

The roof bow 74 may be such as an extruded metal rail. In the extruded embodiment, the bow 74 may be unitary, one-piece and integrally formed. If constructed of metal, the bow 74 may be such as aluminum or an alloy of aluminum, but other metals are permissible. Further, the bow 74 may also be constructed of non-metallic materials, such as plastic, fiberglass or composite materials.

Figure 9:
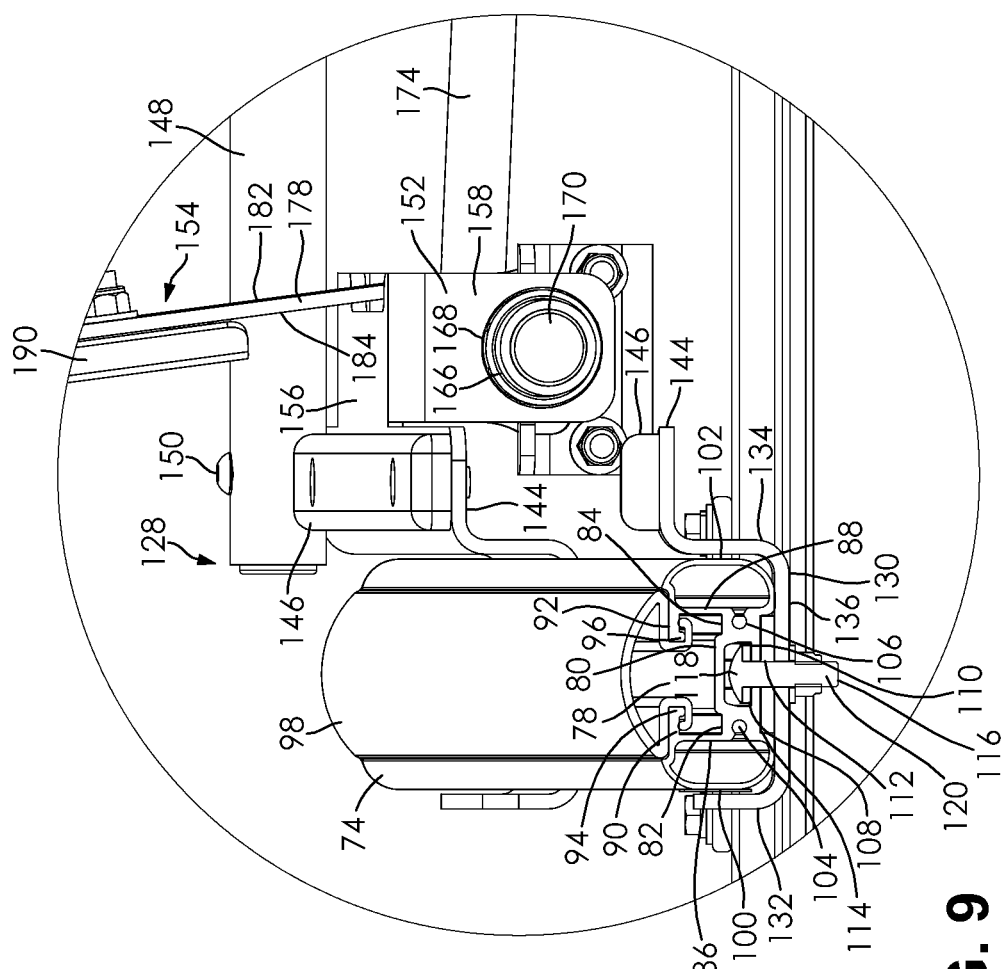
FIG. 9 is a schematic cross-sectional perspective view of certain components of the system.

As may be best seen in FIGS. 8 and 9, an upper channel 78 may be located in an upper portion of the bow 74. The upper channel 78 may extend continuously along the bow 74. The upper channel 78 may extend substantially the same cross-sectional profile or shape.

The upper channel 78 may be defined by a base 80, which may be substantially planar in both the lateral and longitudinal directions. First and second sub-channels 82, 84 may bound the lateral edges of the base 80. The two sub-channels 82, 84 may extend entirely along the longitudinal length of the base 80. The sub-channels 82, 84 may be co-planar with one another, but they may be below the plane of the base 80.

First and second side channel walls 86, 88 may extend from the first and second sub-channels 82, 84 respectively. In one embodiment, the first and second side channel walls 86, 88 may extend transversely upwardly from the first and second sub-channels 82, 84. The first and second side channel walls 86, 88 may extend continuously entirely along the longitudinal length of the first and second sub-channels 82, 84.

The first and second side channels 86, 88 may each have cantilevered portions 90, 92 that extend at least partially over the respective sub-channels 82, 84. The cantilevered portions 90, 92 may extend over the sub-channels 82, 84 to the same lateral extent as one another. Each cantilevered portion 90, 92 may have an inside surface and an outer surface located opposite the inside surface. Each inside surface may have a downwardly extending lip 94, 96 at least partially extending along the inside surface. Preferably, the lips 94, 96 extend continuously entirely along the longitudinal length of each inside surface.

In some embodiments, the cantilevered portions 90, 92 may define between them a constant width gap. The gap may extend entirely along the longitudinal length of the roof bow 74.

It may be appreciated from the above that in some embodiments, the upper channel 78 may be partially enclosed by the base 80, the first and second sub-channels 82, 84, and the first and second side channel walls 86, 88.

A trim piece 98 may be connected to the roof bow 74. The trim piece 98 may be selectively located in the gap defined between the cantilevered portions 90, 92. The trim piece 98 may have a complementary shape to the cantilevered portions 90, 92, including the lips 94, 96 on each of the portions 90, 92.

In some embodiments, the trim piece may at least partially wrap around the cantilevered portions 90, 92 and the lips 94, 96. In this regard, the trim piece 98 may have complementary shaped channels integrally formed therewith to receive the cantilevered portions 90, 92 and the lips 94, 96 therein.

In these embodiments, the channels may contact and at least partially enclose both the inside surfaces and the outer surfaces of the cantilevered portions 90, 92. In this way, the trim piece 98 may be connected to the roof bow 74. In some embodiments, the trim piece 98 may be longitudinally slidable within the gap.

The trim piece 98 may have an upper surface connected to the channels where the upper surface encloses the gap. The upper surface may have an arc-shape so that moisture flows off of the upper surface and does not enter the gap.

The trim piece 98 may be one-piece, integrally formed and unitary. The trim piece 98 may be constructed of a polymeric material including plastic, rubber and compounds of similar performance.

The roof bow may also have first and second bow walls 100, 102. The first and second bow walls 100, 102 may be connected to the first and second side channels walls 86, 88. In one embodiment, the first and second bow walls 100, 102 may each define a curvilinear shape so that both define respective partial hemispheres.

The first and second bow walls 100, 102 may extend substantially continuously along the longitudinal length of the roof bow 74 with the same cross-sectional shape. In some embodiments, the first and second bow walls 100, 102 may have portions that extend parallel with, but which are laterally offset by first and second interior volumes, the first and second side channel walls 86, 88. The first and second bow walls 100, 102 may have a height that extends from the tops of the first and second side channel walls 86, 88 to below first and second channels in the roof bow 74, which are described below.

Within the first and second interior volumes, first and second fastener grooves 104, 106 may be located, respectively. In some embodiments, the fastener grooves 104, 106 may be vertically below the first and second sub channels 82, 84, respectively. The depicted embodiment of the fastener grooves 104, 106 may locate the fastener grooves 104, 106 between the first channel (described below) and the first and second bow walls 100, 102.

The first and second fastener grooves 104, 106 may extend substantially continuously along the longitudinal length of the bow 74 with the same cross-section. In one embodiment, the first and second fastener grooves 104, 106 may have a C-shaped cross section that opens into the interior volumes. The first and second fastener grooves 104, 106 may have a lateral width that is equal to or less than a lateral width of the respective first and second sub-channels 82, 84.

The roof bow 74 may have a first channel 108. The first channel 108 may be located below, such as vertically below, the upper channel 78. In some embodiments, at least a portion of the first channel may be vertically aligned with, such as generally coplanar with, the first and second fastener grooves 104, 106. In that embodiment, the first channel 108 may be laterally bounded by the first and second fastener grooves 104, 106. The first channel 108 may have a lateral width that is equal to or less than the lateral width of the base 80 of the upper channel 78. The first channel 108 may extend substantially continuously along the longitudinal length of the roof bow 74 with the same cross-section.

A base portion 110 of the first channel 108 may be in communication with a fastener channel 112. In some embodiments, the fastener channel 112 may be centered in the base portion 110 of the first channel 108. The fastener channel 112 may extend substantially continuously along the longitudinal length of the roof bow 74 with substantially the same cross-section. The fastener channel 112 may extend through the base portion 110 of the first channel 108 to a second channel 114. In some embodiments, the fastener channel 112 may have a lateral width that is less than the lateral width of the first channel 108 and the second channel 114.

The second channel 114 may be located vertically below the first channel 108 and be in communication with the first channel 108 through the fastener channel 112. Longitudinal centerlines of the first channel 108, the fastener channel 112 and the second channel 114 may be laterally aligned with one another. Bottom portions of the first and second bow walls may define the second channel 114.

The second channel 114 may have a lateral width that is the same or that approximates the lateral width of the base 80 and first and second sub-channels 82, 84 of the upper channel 78. In some embodiments, the vertical height of the second channel 114 may be approximately that of the fastener channel 112. It may be that the first channel 108 has a greater vertical height compared with the fastener channel 112 or the second channel 114. The second channel 114 may extend substantially continuously along the longitudinal length of the roof bow 74 with substantially the same cross-section.

At least one fastener 116 may be located at least partially in the upper channel 78, the first channel 108 and the second channel 114. In some embodiments, the fastener 116 may have a head portion 118 and a shank portion 120. The head portion 118 may be located in the upper channel 78 while the shank portion 120 may be located in the first channel 108 and the second channel 114. The head portion 118 may be wider than the fastener channel 112, which prevents the fastener 116 from falling through the fastener channel 112. Instead, the first channel 108 functions as a track along which the head portion 118 may selectively slide along and within. Similarly, the fastener channel functions 116 as a track along which the shank portion 120 may selectively slide along and within.

The riser 56 of the roof bow mounting portion 54 may be connected to a channel portion 122. The channel portion 122 may be adapted to be selectively located at least partially within the second channel 114. In this regard, the channel portion 122 may have a similar shape and size to the second channel 114. In one embodiment, the second channel 114 may have at least a partially rectangular cross-sectional shape. The channel portion 122 may also have a partially rectangular cross-sectional shape. The channel portion 122 may have a smaller lateral width compared to the second channel 114 so that the channel portion 122 may fit within the second channel 114. Further, the channel portion 122 may be located within the second channel 114 anywhere along the longitudinal length of the second channel 114. In some embodiments, the channel portion 122 may be selectively slid within the second channel 114. In these cases, the channel portion 122 may extend in a parallel direction to the primary direction of the roof bow 74.

The fastener 116 may extend through an aperture in the channel portion 122. In some embodiments two fasteners 116 may be located through the channel portion 122, the fastener channel 112 and the second channel 114. Nuts 124 may be located on the shank portion 120 of the fasteners 116 extending through the channel portion 122 to secure the fasteners 116, and thus the channel portions 122, in place in a desired position along the second channel 114 and the roof bow 74.

As noted above, the system 20 may be comprised of a first roof bow 74 and a second roof bow 76. The two roof bows 74, 76 may be substantially the same in shape, size and construction. Often, the two roof bows 74, 76 may extend substantially parallel one another above the exterior roof surface 32 of the vehicle 22. While they may be substantially parallel, the two roof bows 74, 76 may be separated from one another by a gap 126. The width of the gap 126 may vary according the type of vehicle 22 the system may be located on, as well as the type of ladders that may be located on the system 20. The roof bows 74, 76 may be attached to the roof bow mounting portions 54 described above and then to the rails 24, 26 also as described above. Some embodiments have the roof bows 74, 76 extending above the first and second rails 24, 26 and extending substantially transverse the first and second rails 24, 26.

The above describes and depicts one embodiment of attaching the roof bows 74, 76 to the vehicle 22. In other embodiments, a bracket (not shown) may connect the roof bow 74, 76 to one of the rails 24, 26. The bracket may be such as sheet metal that has a body portion and forward and rear flange portions connected to the body portion. The forward and rear flange portions may extend generally transverse the body portion and may add strength to the body portion.

A lower portion of the bracket may be attached to a rail 24, 26 in a fixed manner, or the manner described above, or the lower portion may be attached directly to the vehicle 22, such as the vehicle roof 32. An upper portion of the bracket may be attached to a roof bow 74, 76 in a fixed manner, such as bolted thereto, or by connecting with a channel in the roof bow 74, 76, as described above.

Many of the figures also depict one embodiment of a portion of a slide assembly 128 attached to the second channel 114 of the roof bow 74. The slide assembly 128 may be connected to the second channel 114 in a manner similar to that described above for the riser 56. For example, the slide assembly 128 may have a bow slide 130, which may be seen in FIGS. 8, 9, 14 and 15. The bow slide 130 may have a complementary shape to at least part of the roof bow 74, such as the first and second bow walls 100, 102. The bow slide 130 may have a generally C-shaped cross-sectional shape comprised of a first bow slide wall 132, a second bow slide wall 134 and an intermediate bow slide wall 136 extending between the first and second bow slide walls 132, 134. The first and second bow slide walls 132, 134 may be at opposite ends of the intermediate bow slide wall 136 and they may extend generally transverse the intermediate bow slide wall 136.

In some embodiments, a channel bar 138 may be associated with, such as located within, the bow slide 130. In a non-limiting example, the channel bar 138 may be located on the intermediate bow slide wall 136 approximately equal distance from the first and second bow slide walls 132, 134. The channel bar 138 may have a generally constant width, height and length and may be in the shape of a rectangle. While one shape and location of the channel bar 138 are mentioned, other shapes and locations may be used. The channel bar 138 may also be one piece, but it may also be comprised of two or more pieces. The channel bar 138 may generally extend the length of the intermediate bow slide wall 136. Preferably, the channel bar 138 may have a complementary shape and size to the second channel 114. The channel bar 138 may have a smaller lateral width compared to the second channel 114 so that the channel bar 138 may fit within the second channel 114 and be capable of selective movement there along.

A fastener bar 140 may be located adjacent the channel bar 138, as also shown in FIGS. 8, 9, 14 and 15. In some embodiments, the fastener bar 140 may be located above the channel bar 138. The fastener bar 140 may generally extend along the length of the channel bar 138 and generally centered thereon. Thus, in some cases, the fastener bar 140 may be located approximately equal distance from the first and second bow slide walls 132, 134. The fastener bar 140 may have a generally constant width, height and length and may be in the shape of a rectangle. While one shape and location of the fastener bar 140 are mentioned, other shapes and locations may be used. The fastener bar 140 may also be one piece, but it may also be comprised of two or more pieces. Preferably, the fastener bar 140 may have a complementary shape and size to the first channel 108. The fastener bar 140 may have a smaller lateral width compared to the first channel 108 so that the fastener bar 140 may fit within the first channel 108 and be capable of selective movement there along.

The fastener bar 140 may be used to connect fasteners 142, at least partially located in the first channel 108, and which may also extend into the second channel 48. In some embodiments, the fastener bar 140 is located under the heads of fasteners 142 in the first channel 108. The fastener bar 140 may be used to ensure the fasteners 142 move in a uniform fashion within the first channel 108.

The fasteners 142 may extend through the fastener bar 140, through the channel bar 138 and through the intermediate bow slide wall 136. Nuts and washers may be located on the fasteners 142 opposite the channel bar 138 on the intermediate bow slide wall 136.

The second bow slide wall 134 may be connected to a support flange 144 of the slide assembly 128, as shown in FIGS. 9, 14 and 15. The support flange 144 may be one piece, unitary and integrally formed with the second bow slide wall 134, or they may be separate pieces that are connected together. In some embodiments, the second bow slide wall 134 may form an S-shaped cross section with the support flange 144 and the intermediate bow slide wall 136. The support flange 144 may be located at an upper portion of the second bow slide wall 134 which may locate the support flange 144 above the intermediate bow slide wall 136, the channel bar 138 and the fastener bar 140. The support flange 144 may have a substantially constant height, width and length. Further, in some embodiments, the support flange 144 may be cantilevered from the second bow slide wall 134 so that it does not extend over the intermediate bow slide wall 136, instead, it may extend in the opposite direction from the intermediate bow slide wall 136.

The first bow slide wall 132, the intermediate bow slide wall 136 and the second bow slide wall 134 may form a complementary shape to at least a portion of the bow 74. In one embodiment, the first and second bow slide walls 132, 134 may be at least partially complementary in general size and shape to the first and second bow walls 100, 102. In some cases, the first and second bow slide walls 132, 134 may be dimensioned slightly larger than the first and second bow walls 100, 102 so that the first and second bow slide walls 132, 134 may be selectively slid along the first and second bow walls 100, 102.

In some embodiments, a support bar 146 may be located on the support flange 144, which may also be seen in FIG. 9. The support bar 146 may extend the length of the support flange 144, or only a portion thereof. The support bar 146 may be constructed a single piece or it may be comprised of two or more pieces. The support bar 146 may be constructed of metal, but perhaps coated with paint or a rubber-like material, and/or the support bar may be constructed of a non-metal material comprised of polymer, plastic, fiberglass or composite materials. The support bar 146 may be resistant to abrasion with a low coefficient of friction to facilitate loading and unloading of a ladder, which may rest on the support bar 146. Further, the support bar 146 may be constructed of a robust material capable of existing in an outdoor environment and exposed to the elements.

In some cases, the support bar 146 may not extend the entire length of the support flange 144. In these cases, a length of the support flange 144 may be reserved for a side tube 148. An end portion of the side tube 148 may rest on the support flange 144 and be connected thereto. In one example, a fastener 150 may extend through the end portion of the side tube 148 and into the support flange 144 to connect them together. The side tube 148 extends in a generally transverse manner to the direction of the support flange 144.

In some embodiments, the support flange 144 may transition to a partial housing 152 for a selective retention system 154. The partial housing 152 may be unitary, one piece and integrally formed with the support flange 144, or it may be separately formed and attached to the support flange 144.

The partial housing 152 may have an upper portion 156 that may extend in a generally parallel, co-planar fashion with the support flange 144. The upper portion 156 may be substantially planar. In some embodiments, the upper portion 156 may be parallel but not coplanar with the intermediate bow slide wall 136.

First and second legs 158, 160 may extend downwardly on either end of the upper portion 156. The first and second legs 158, 160 may extend in a transverse direction to the upper portion 156. The legs 158, 160 may extend substantially parallel one another and be of generally equal size and shape, but variations are permissible.

An inner portion 162 of the housing 152, partially defined by the upper portion 156 and the first and second legs 158, 160, may be generally open to permit a portion of the retention system 154 to selectively move therein. A bottom portion 164 of the housing 152 may also be open for the same reason and/or for weight savings.

Figure 4:
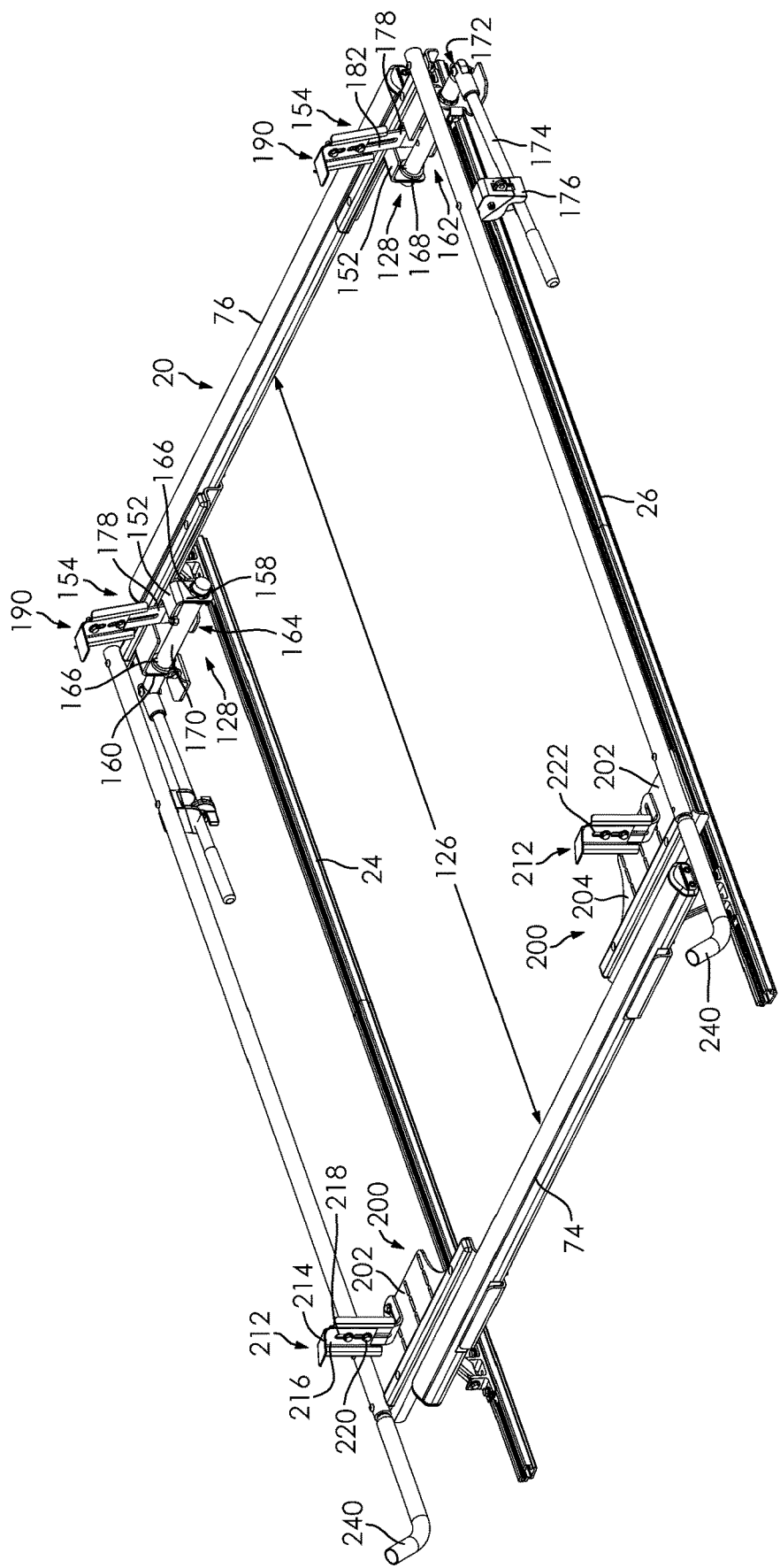
FIG. 4 is a schematic upper perspective view of the roof rack system in an extended condition.

Aligned apertures 166 may be located in the first and second legs 158, 160. The apertures 166 may accommodate bushings, bearings or other friction reducing materials 168 therein. In some embodiments, a retention tube 170, which may be part of the selective retention system 154, may be located within the apertures 166 and supported for selective rotation by the friction reducing material 168. The retention tube 170 may be such as a one piece, hollow or solid tube that extends between the apertures. An outboard end 174 of the retention tube 170 may be connected to a handle 174, such as through a pivotal connection, as shown in FIG. 4. The pivotal connection permits the handle 174 to be moved from a stowed condition, that may be substantially transverse the retention tube 170, to a use condition. In the stowed condition the handle 174 may be selectively connected with a latch 176 to the side tube 148. In the use condition, the handle 174 can pivot with respect to the retention tube 170 and rotated, resulting in a rotation of the retention tube 170. The handle 174 may be adapted for rotation in an arc generally parallel with the longitudinal axis 28 of the vehicle 22. As noted, the retention tube 170 can be selectively rotated but is otherwise retained in its position by the partial housing 152.

In some embodiments, a pivot member 178 may be attached to the retention tube 170. The pivot member 178 may be part of the selective retention system 154. The attachment may be such that the pivot member 178 moves with the retention tube 170; the connection may be such as through mechanical fasteners, welding and/or adhesives. It may also be possible to form the pivot member 178 with the retention tube 170 so that the two are unitary, integrally formed and one piece.

In some embodiments, the pivot member 178 may be attached to a front face 180 of the retention tube 170. The front face 180 may be located generally opposite the bow slide 130 on the housing 152.

The pivot member 178 may be a bar or plate-like member having a forward surface 182 and a rear surface 184 bounded by side surfaces 186. The pivot member 178 may have a generally constant thickness defined between the forward and rear surfaces 182, 184. The pivot member 178 may be generally rectangular in shape, but other shapes may be used.

The pivot member 178 may have a slot or groove 188 extending through the pivot member 178 from the forward to the rear surfaces 182, 184. The slot 188 may extend a portion of the height of the pivot member 178 in a linear fashion.

A gripper portion 190 may be selectively attached to the pivot member 178. The gripper portion 190 may be comprised of a first leg 192 and a second leg 194 where the two legs 192, 194 may extend generally transverse one another.

In one embodiment, the first leg 192 may selectively attach to, and extend at least partially parallel with, the rear surface 184 of the pivot member 178. The attachment may be such as through mechanical fasteners 196, including nuts and bolts, that permit the gripper portion 190 to be selectively vertically adjusted with respect to the pivot member 178, and then the two can be secured in a non-moving relationship to one another. In the depicted embodiment, the mechanical fastener 196 can extend through the first leg 192, and through the slot 188 in the pivot member 178.

The first leg 192 may also have side flanges 198. The side flanges 198 may extend the length of the first leg 192 or only a portion thereof. The side flanges 198 may be generally parallel one another and generally transverse the gripper portion 190. In some embodiments, the side flanges 198 extend on either side of the pivot member 178 and they may extend forward beyond the forward surface 182 of the pivot member 178.

In the ship through condition, shown in FIGS. 1-3, the retention tube 170 may be rotated by the handle 174 so that the pivot member 178 is generally extending parallel with the longitudinal axis 28 of the vehicle 22. In this ship through condition, the second leg 194 of the gripper portion 190 may extend generally transverse the longitudinal axis 28 of the vehicle 22.

In other embodiments of the ship through condition, shown in FIGS. 1-3, the pivot member 178 may not need to be attached to the retention tube 170. Instead, the pivot member 178 and its associated components (described above) may be connected to the retention tube 170 when the system 20 has reached its destination and to transition to the expanded condition.

In the expanded condition, shown in FIGS. 4-5 and 10-13, the retention tube 170 may be rotated by the handle 174 so that the second leg 194 of the gripper portion 190 may extend generally over the partial housing 152. The second leg 194 maybe generally parallel the upper portion 156 of the partial housing 152, but the second leg may also be located at a non-parallel angle to the upper portion 156.

It may also be appreciated that in the ship through condition the slide assembly 128 may be moved inwardly, toward the vehicle longitudinal axis 28, along the roof bow 74. In such an embodiment, the nuts 124 on the fasteners 116 extending through the first and second channels 108, 114, as well as the fastener bar 140, the channel bar 138 and the intermediate bow slide wall 136, may be loosened. This permits the fasteners 116, as well as the fastener bar 140 and the channel bar 138, and thus the slide assembly 128, to selectively slide within the roof bow first and second channels 108, 114. Moving the slide assembly 128 toward the longitudinal axis 28 reduces the overall width of the roof rack system 20.

The roof rack system 20 may also have other options to reduce its height and/or width for purposes of transport. As shown in FIGS. 1-2, the side tube 148 may extend from the support flange 144 associated with one bow 74 to a second slide assembly 200, which may include a gripper platform slide 202, associated with the other bow 76. In other embodiments, a side tube 148 may not be needed. When a side tube 148 is used, the side tube 148 may be attached to the gripper platform slide 202 to be secured and connected thereto. The gripper platform slide 202 may be comprised of a generally planar portion 204 to which the side tube 148 may attach. The planar portion 204 may have an upper and a lower surface 206, 208 that bound a substantially constant thickness of the planar portion 204.

The planar portion 204 may have a series of slots 210 formed therein. The slots 210 may extend from the upper surface 206 to the lower surface 208. The slots 210 may generally extend parallel the longitudinal axis 28 of the vehicle 22. The slots 210 may be generally equally spaced from one another.

In some embodiments, a gripper structure 212 may be located on the gripper platform slide 202. The gripper structure 212 may be located so at least a portion of it selectively contacts the upper surface 206 of the planar portion 204. It may be that the gripper structure 212 comprises an upper flange 214 and a lower flange 216, where the lower flange 216 contacts the upper surface 206 of the planar portion 204. The lower flange 216 may have one or more fastener openings 218 therein. The openings 218 may receive a fastener 220, such as a bolt. The bolt 220 may extend through the opening 218 and into one of the slots 210. As noted, because there are a number of slots 210 the lower flange 216 may be located above any one of them. In some embodiments, it be preferred to locate the lower flange 216 on a slot 210 so that the gripper structure 212 is generally aligned with the gripper portion 190 of the selective retention system 154. Before the fastener 220 is tightened, the gripper structure 212 may be moved parallel the longitudinal axis 28 of the vehicle 22 along the selected slot 210 along the planar portion 204 to locate the gripper structure 212 a predetermined distance from the gripper portion 190 of the selective retention system 154.

The upper flange 214 may extend substantially transverse the lower flange 216. The upper flange 214 may have a slot 222. The slot 222 may extend substantially the length of the upper flange 214.

In the ship through condition, shown in FIGS. 1 and 2, the gripper structure 212 and the gripper portion 190 may be removed from the gripper platform slide 202 to reduce the height profile of the system 20.

In some cases a support flange 224 may be connected to the gripper platform slide 202. For example, a support flange 224 may be located substantially along the width of the upper surface 206 of the planar portion 204. The support flange 224 may be the same or similar to the support flange 144 described above in terms of function, material and attachment. Further, a support bar 146, as described above, may be attached to the support flange 224.

The gripper platform slide 202 may also comprise a bow slide 226. The bow slide 226 may be connected to the gripper platform slide 202 with mechanical fasteners or by welding, or it may be one piece, unitary and integrally formed with the planar portion 204.

The bow slide 226 may have a generally C-shaped cross-sectional shape comprised of a first bow slide wall 228, a second bow slide wall 230 and an intermediate bow slide wall 232 extending between the first and second bow slide walls 228, 230. The first and second bow slide walls 228, 230 may be at opposite ends of the intermediate bow slide wall 232 and they may extend generally transverse the intermediate bow slide wall 232.

In some embodiments, a channel bar 234 may be located within the bow slide 226. In a non-limiting example, the channel bar 234 may be located and used as with the channel bar 138.

A fastener bar 236 may be located adjacent the channel bar 234 and used as with the fastener bar 140.

The second bow slide wall 230 may be connected to the support flange 224 of the gripper platform slide 202. The support flange 224 may be one piece, unitary and integrally formed with the second bow slide wall 230, or they may be separate pieces that are connected together. In some embodiments, the second bow slide wall 230 may form an S-shaped cross section with the support flange 224 and the intermediate bow slide wall 232. The support flange 224 may be located at an upper portion of the second bow slide wall 230 which may locate the support flange 224 above the intermediate bow slide wall 232, the channel bar 138 and the fastener bar 140. The support flange 224 may have a substantially constant height, width and length. Further, in some embodiments, the support flange 224 may be cantilevered from the second bow slide wall 230 so that it does not extend over the intermediate bow slide wall 232, instead, it may extend in the opposite direction from the intermediate bow slide wall 232.

The first bow slide wall 228, the intermediate bow slide 232 wall and the second bow slide wall 230 may form a complementary shape to at least a portion of a bow 76. In one embodiment, the first and second bow slide walls 228, 230 may be at least partially complementary in general size and shape to the first and second bow slide walls 228, 230. In some cases, the first and second bow slide walls 228, 230 may be dimensioned slightly larger than the first and second bow walls 100, 102 so that the first and second bow slide walls 228, 230 may be selectively slid along the first and second bow walls 100, 102.

In some embodiments, one of which is shown in FIG. 6, the intermediate bow slide walls 136, 232 associated with the gripper platform slide 202 and the selective retention system 154 may be generally coplanar and parallel one another. Further, the first bow slide walls 132, 228 and the second bow slide walls 134, 230 of the gripper platform slide 202 and the selective retention system 154 may be generally parallel one another. In such an embodiment, the inboard end portions of the bow slide 130 of the gripper platform slide and the inboard end portions of the selective retention system 154 may be coplanar, as may be appreciated from FIG. 14

The inboard end portions may be coplanar in both the ship through and the extended conditions as they may effectively move together during selective sliding of the bow slide 130 and the selective retention system 154. As noted above, the side tube 148 connects the gripper platform slide 202 and the selective retention system 154 to facilitate collaborative movement between the two. It can be appreciated, however, that the side tube 148 can be removed and the selective retention assembly 154 and the gripper platform slide 202 can be individually moved.

The roof rack system 20 can be assembled on a vehicle 22 in the ship through condition, or it can be provided in a kit in the ship through condition (for a compact shipping package) for the end user to install on the vehicle 22. In either case, the ship through condition generally has the gripper portions 190 and the gripper structures 212 detached from the gripper platform slide 202. Further, the gripper portions 190 of the pivot members 178 can be detached from the pivot members 178. The pivot members 190 may be rotated by the handle 174 so that they are generally aligned with the longitudinal axis 28 of the vehicle 22 and generally coplanar with the side tubes 148.

In addition, the fasteners 116, 142 associated with both bow slides can be loosened so that the bow slide 130 and the gripper platform slide 202 can move with respect to the roof bows 74, 76. In some embodiments, the gripper platform slide 202 and the bow slide 130 on either end of a side tube 148 can be moved inwardly, or inboard, toward the longitudinal axis 28 of the vehicle 22. As noted above, the gripper platform slide 202 and the selective retention assembly 154, along with the side tube, 148 may move together. Preferably, the side tubes 148 are moved inwardly such that they are well inboard of the first and/or second rails 24, 26. This may also include locating the handle 174 well inboard of the first and/or second rails 24, 26.

From FIGS. 2 and 3, one embodiment of a ship through condition of the roof rack system 20 on one embodiment of a vehicle 22 is schematically depicted. It can be appreciated that by reducing the width and/or height signature of the system 20, such as through the steps mentioned above, the vehicle 22 and the system 20 can be accommodated in a standard rail car 238 with room to spare.

The expanded condition of the system 20 may be appreciated from other the figures, where the gripper platform slide 202 and the selective retention system 154 have been moved away from the longitudinal axis 28 of the vehicle 22 in the outboard direction, where they can be fixed in place. In such a condition, the gripper platform slide 202 and the selective retention system 154 have been moved to locate the slide tubes (discussed below) and the slide tubes 248 outboard from the first and/or second rails 24, 26. Further, the gripper portions 190 and the gripper structures 212 have been connected to the gripper platform slide 202 as described above. And, the gripper portions 190 being attached to the pivot members 178 are rotated so they are generally perpendicular to the longitudinal axis 28 of the vehicle 22 and the side tubes 148 when the handle 174 is rotated.

End retention portions 240 may also be selectively attached to the side tubes 148 in the expanded condition. Each of the end retention portions 240 may be generally the same in terms of size, shape and location on the side tubes 148, or they may vary. In some embodiments, the end retention portions 240 may be curved, such as are shaped, so that they extend upwardly from the side tubes 148. The end retention portions 240 may provide a height dimension to the system 20 that may function to at least partially bound and retain items. The end retention portions 240 may be substantially axially aligned with the side tubes 148. In some cases, the end retention portions 240 may be used to protect the sides of the vehicle 22 during loading and loading of structures, such as ladders, on and off the system 20. In other words, they can assist in preventing a ladder from sliding off the roof 32 of the vehicle 22 and undesirably contacting the sides of the vehicle 22 where damage to the vehicle 22 and/or the ladder may result.

The end retention portions 240 may be connected to the side tubes 148, such as by sliding the end retention portions 240 at least partially on the side tubes 148. The end retention portions 240 may be secured with mechanical fasteners to the side tubes 148. In the depicted embodiment, end retention portions 240 are attached to forward ends of both side tubes 148, but it may be that only a single end retention portion 240 is attached to a side tube, 148 that all the side tubes 148 have end retention portions 240 or only selected ends of the side tubes 148 have end retention portions 240. The end retention portions 240 may be removed for the ship through condition.

FIGS. 10-13 depict another embodiment where an additional roof bow 242 is connected to the first and second side rails 24, 26. The additional roof bow 242 may be termed an intermediate roof bow that may be located between the first and second roof bows 74, 76 In the depicted embodiment, the intermediate roof bow 242 may be located closer to the first, or rear, roof bow, 74 compared with the second, or front, roof bow 76 but other locations are permissible. The location of the additional roof bow 242 may be a function of the ladder type and size to be carried by the system 20.

The intermediate roof bow 242 may be substantially the same as the first or second roof bows 74, 75 in terms of size, shape, features and function. Thus, it may connect with the first and second side rails 24, 26 as described above and depicted in the other figures.

The intermediate roof bow 242 may have one or more slide assemblies 128, 202, gripper platform slides 202 and/or components of one or the other connected thereto. By way of one example, a bow slide 130 may be provided with a support flange 144 on which a support bar 146 and/or a gripper structure 212 and a gripper portion 190 may be secured thereto. In some embodiments, the second leg 194 of the gripper portion 190 on the intermediate roof bow 242 may be adapted to face in an opposite direction from second leg 194 of gripper portion 190 associated with the first roof bow 74. In such an embodiment, the second leg 194 of the gripper portion 190 on the intermediate roof bow 242 may be adapted to face the same direction as the second leg 194 of the gripper portion 190 on the second roof bow 76.

Figure 10:
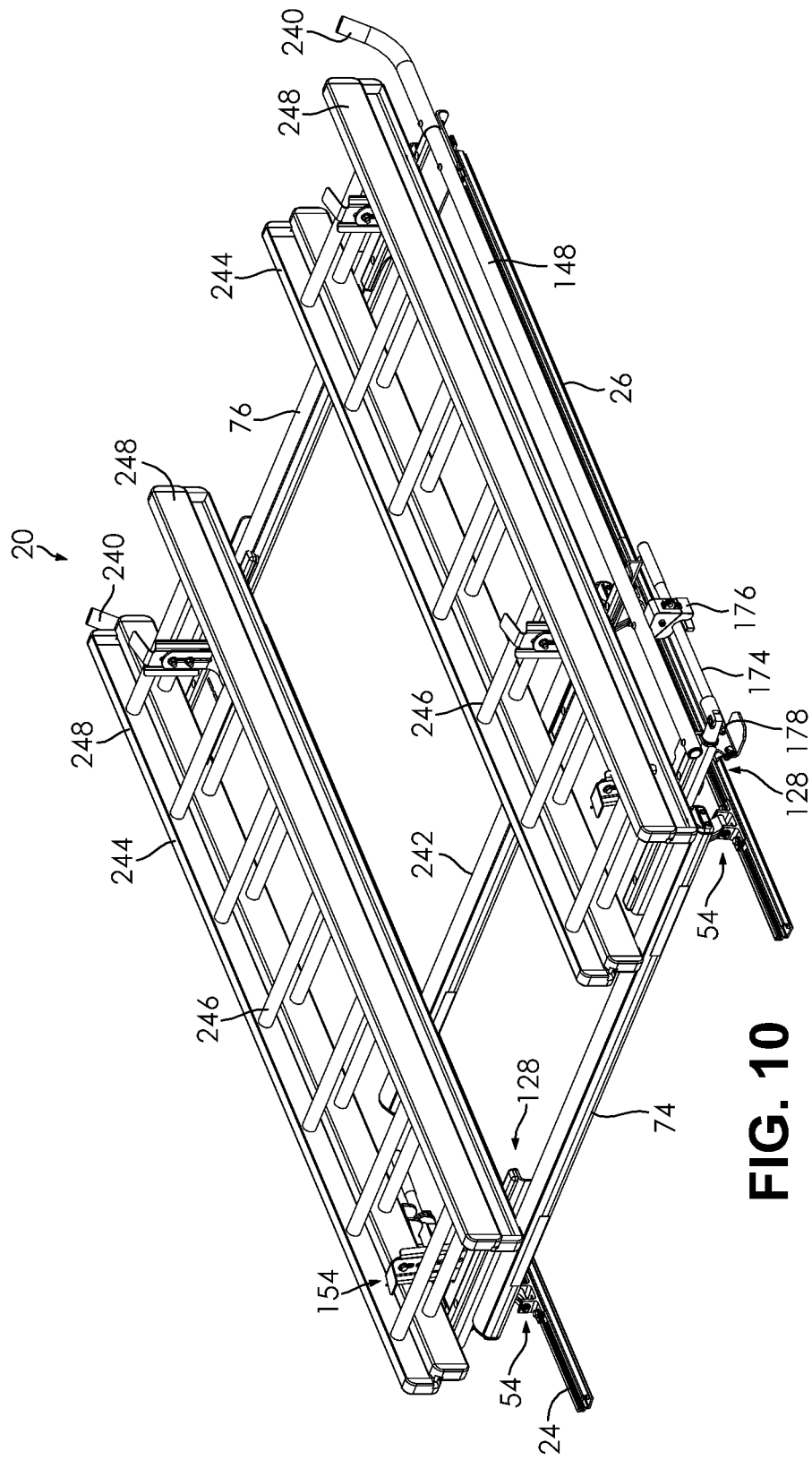
FIG. 10 is a schematic upper perspective view of the system with one embodiment of two ladders connected thereto.

FIG. 10 depicts one embodiment where two full length ladders 244 are located on the roof rack system 20. This embodiment shows that a first ladder 244 may be secured by a gripper portion 190 associated with the first roof bow 74 and a gripper portion 190 associated with the second roof bow 76. This embodiment also shows that a second ladder 244 may be secured by a gripper portion 190 associated with the first roof bow 74, a gripper portion 190 associated with the intermediate roof bow 242 and/or a gripper portion 190 associated with the second roof bow 76.

In FIG. 10, as well as the other figures, the height adjustability of the second leg 194 of the gripper portion 190 can be readily appreciated. Namely, the second legs 194 of the individual gripper portions 190 can be adapted to extend above the rungs 246 of a ladder 244 so as to assist in securing the ladder 244 thereto. Further, it is also possible to move and then secure the slide assemblies 128, 200 and/or the gripper platform slide 202 so that the gripper portions 190 are located between the side rails 248 of any ladder 244 to be stored thereon.

Figure 11:
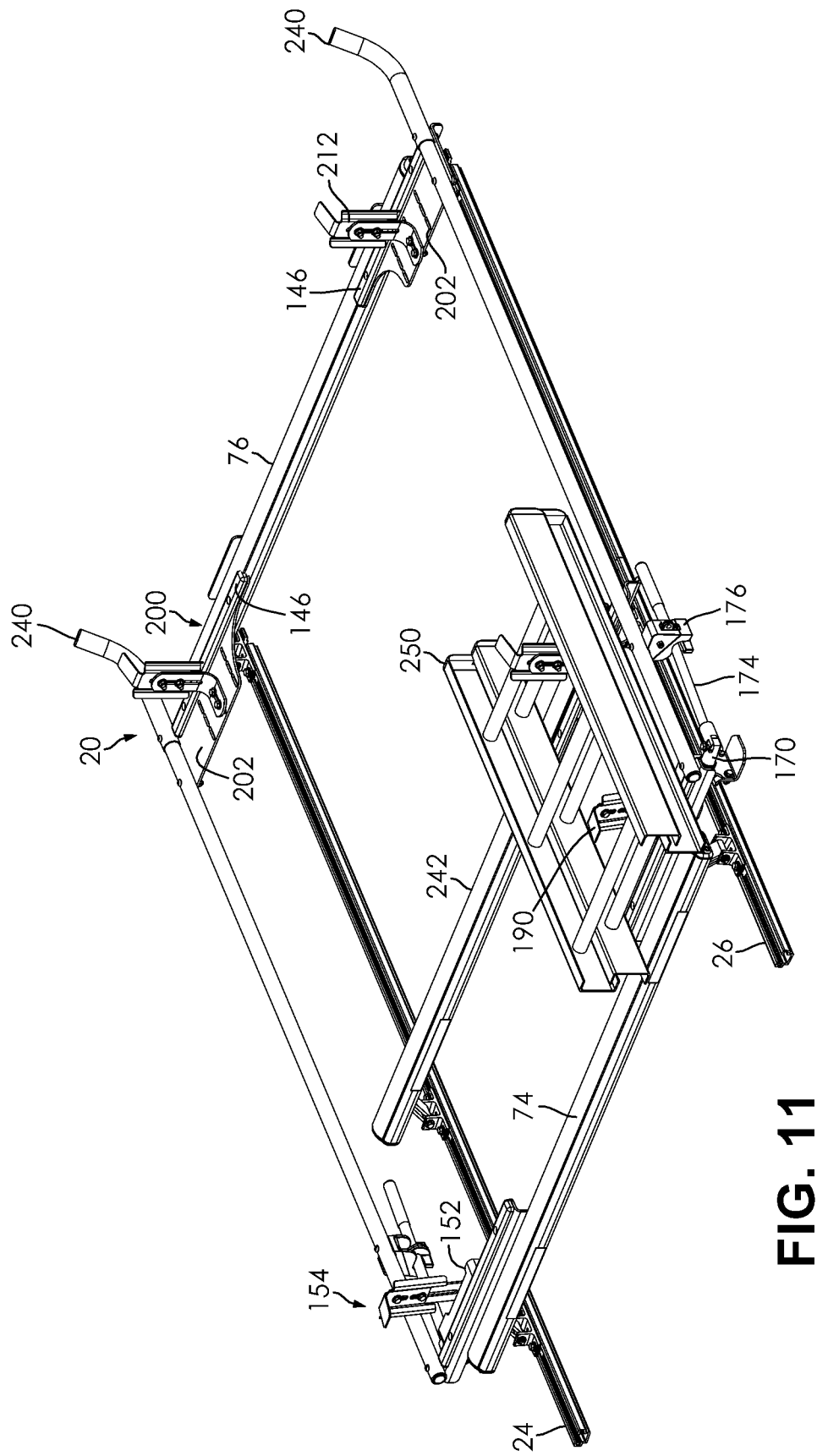
FIG. 11 is a schematic upper perspective view of the system with a single ladder connected thereto.

FIG. 11 depicts another embodiment where a third ladder 250, which may not be as long as a full length ladder, 244 is attached to the system 20. The third ladder 250 is attached to the system 20 as described above using the gripper portions 190 associated with the first roof bow 74 and the intermediate roof bow 242.

Figure 12:
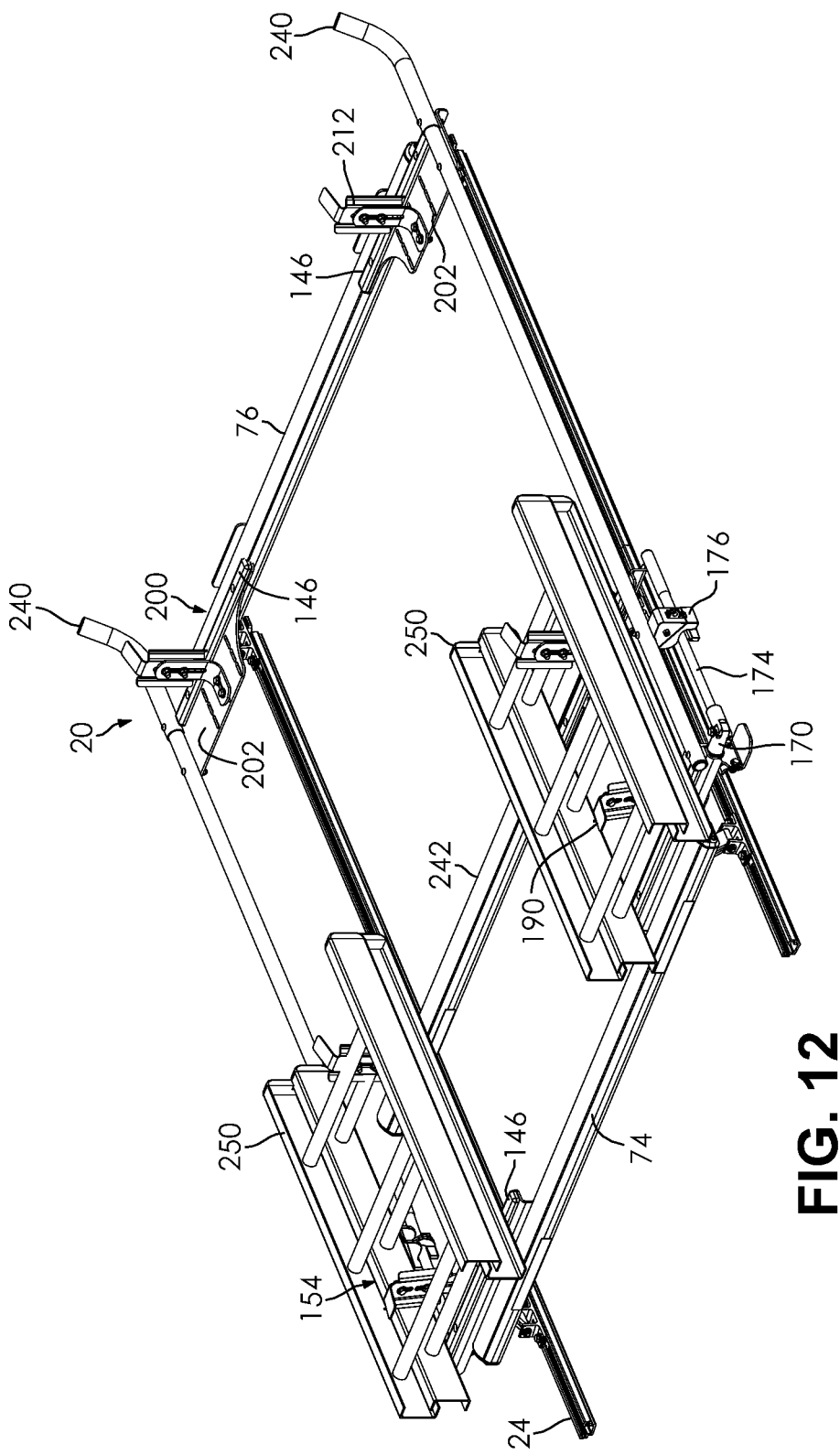
FIG. 12 is another schematic upper perspective view of the system from FIG. 11 with two ladders connected thereto.

FIG. 12 depicts another embodiment where a fourth ladder 250 is added, which may also be not as long as a full length ladder 244. Here also, the fourth ladder 250 may be attached to the system 20 as described above using the gripper portions 190 associated with the first roof bow 74 and also the intermediate roof bow 242.

Figure 13:
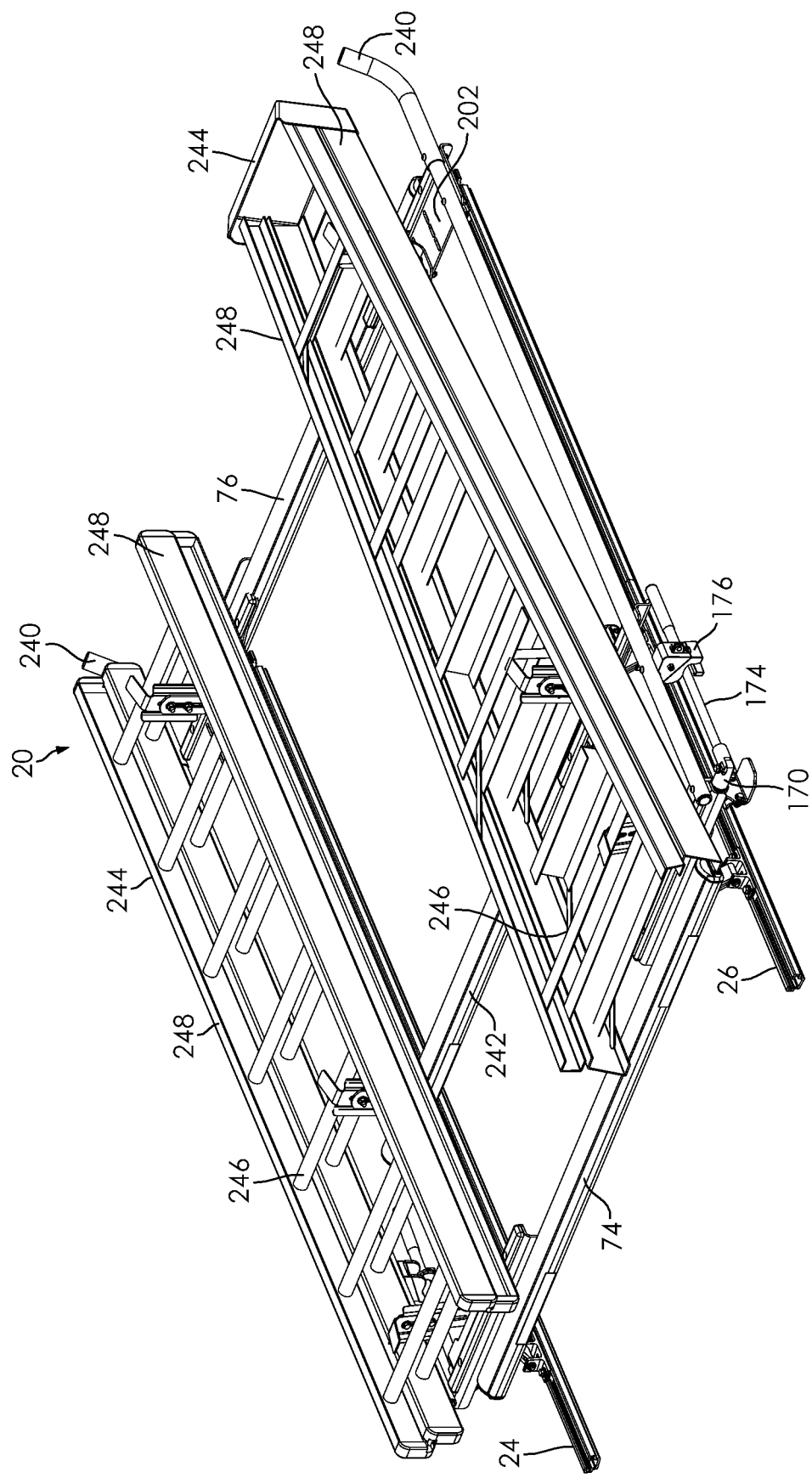
FIG. 13 is a schematic upper perspective view of the system from FIGS. 11 and 12 with one embodiment of two ladders connected thereto.

FIG. 13 depicts an embodiment where two full length ladders 244 of different construction are attached to the system 20. The figure indicates that different types of ladders 244 can be accommodated on the system 20 regardless of construction.

As shown in the representative FIGS. 10-13, the gripper portions 190 are sized, shaped and located to be selectively placed between both the rungs 246 of a ladder 244, 250 and the side rails 248 of the ladder 244, 250. By way of example, to release a ladder 244, 250, such as the first ladder 244 on the ladder rack system 20 in FIG. 10, the handle 174 can be released from its latch 176 and rotated away from the latch 176 in the outboard direction away from the longitudinal axis 28 of the vehicle 22. The handle 174 can then be pivoted, or rotated, downwardly, such as in a general clockwise direction as suggested in FIG. 6. The handle 174, being connected to the retention tube 170, causes the retention tube 170 to rotate in the partial housing 152. The rotation of the retention tube 170 causes the pivot member 178, and thus the gripper portion 190, to rotate away from the partial housing 152. The gripper portion 190 simultaneously rotates away from the adjacent ladder rung 246. The gripper portion 190 may be rotated from its generally 90 degree position to 30 degrees or less (measured from horizontal) so that the gripper portion 90 is no longer substantially blocking the ladder rung 246. The ladder 244, 250 can then be slid forward on the system 20 toward the second roof bow 76 to clear the ladder rung 246 from the gripper portion 190 adjacent the second roof bow 76. The portion of the ladder 244, 250 adjacent the first roof bow 74 can then be lifted vertically so that it clears any remaining portion of the gripper portion 190. The same portion of the ladder 244, 250 can then be rotated and moved outwardly from the system 20 and the vehicle 22. The ladder 244, 250 portion can then be lowered to the ground. The opposite end portion of the ladder 244, 250 can then be removed from the system 20 adjacent the second roof bow 76. The process can be reversed to secure the ladder 244, 250 to the system 20.

In some embodiments certain components of the system 20 may be constructed of a robust material capable of withstanding harsh outdoor environments in which vehicles operate. In some embodiments, the components may be constructed of the same material, but they may be constructed of different materials. Possible materials for the system components may include metals, plastics, polymers and/or composite materials. The metal may comprise extruded aluminum alloy.

Figure 16:
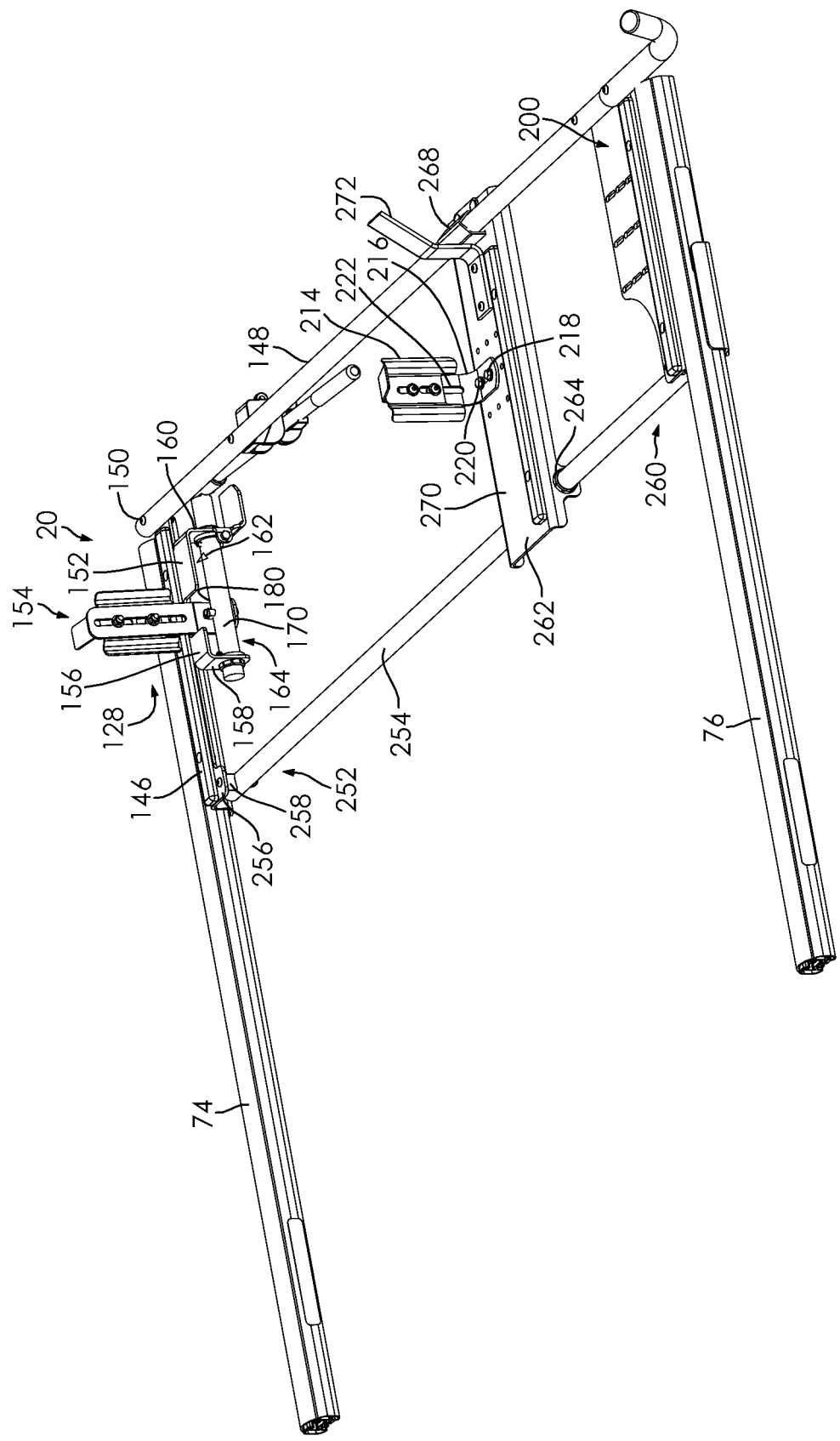
FIG. 16 is an upper perspective view of the system with additional features.
Figure 17:
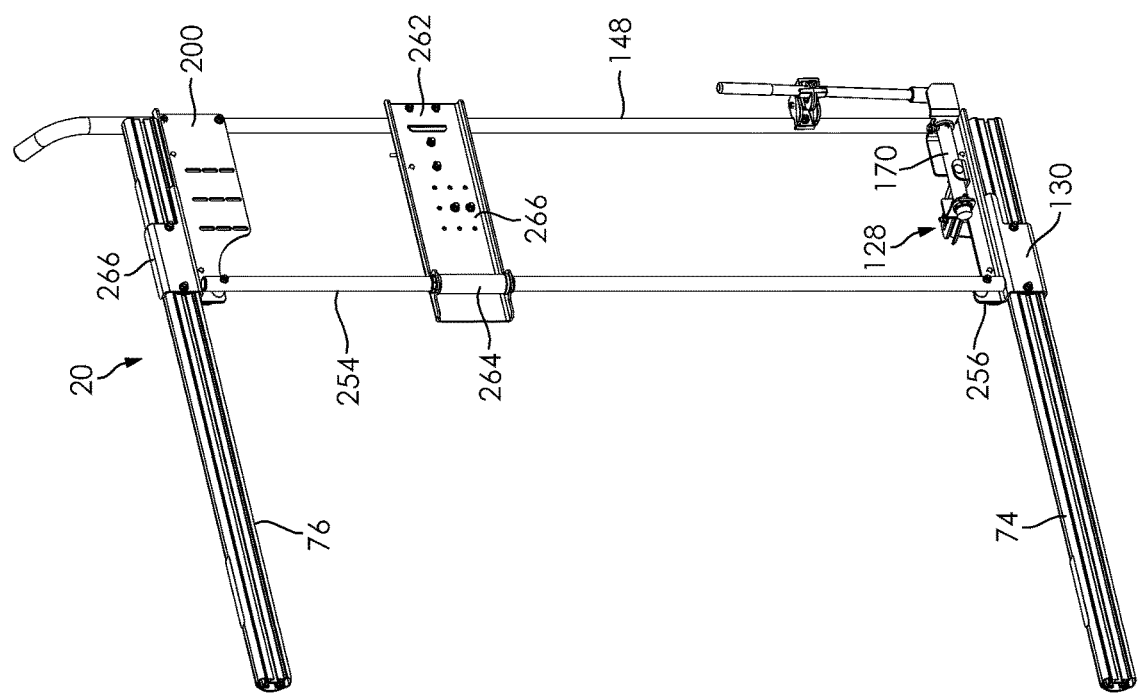
FIG. 17 is a lower perspective view of the system of FIG. 16.

Turning now to FIGS. 16 and 17, another embodiment of the system 20 is depicted. In this embodiment, a first end portion 252 of a slide tube 254 has been attached to a slide tube flange 256 extending from the support flange 144. The attachment may be such as with one or more mechanical fasteners. A bushing 258 or the like may be located between the first end portion 252 of the slide tube 254 and the slide tube flange 256.

The slide tube 254 may extend substantially parallel and coplanar with the side tube 148. In some embodiments, the slide tube 258 may be of the same size, shape and construction as the side tube 148. In other embodiments, these aspects between the two tubes 148, 254 may differ. Further, while the term tube is used, solid or partially solid constructions may be used. Further yet, cross sections other than circular may be used.

The slide tube 254 may extend to the gripper platform slide 202 where a second end portion 260 of the slide tube 254 may be connected thereto. The connection may be such as the first end portion 252.

A carriage 262 may be selectively moveably mounted to the slide tube 254 and/or the side tube 148. In one embodiment, the carriage 262 has a least one slide tube housing 264 on a lower surface 266. The at least one slide tube housing 264 slidably receives the slide tube 254 therein. In other cases, first and second aligned slide tube housings 264 on the lower surface 266 of the carriage 262 are provided to slidably receive the slide tube 254 therein.

A side tube housing 268 may be arranged on an upper surface 270 of the carriage 262. The tube 148 may receive the side tube 148 therein and permit selective sliding movement of the carriage 262 along the side tube 148.

In some embodiments, the upper surface 270 of the carriage 262 may be positioned so that it is substantially coplanar with an upper surface 270 of the support bar 146 and the upper surface 206 of the gripper platform slide 202.

A gripper portion, such as described above in 190, may be attached to the upper surface 270 of the carriage 262. The gripper portion 190 may comprise an upper flange 214 and a lower flange 216, where the lower flange 216 contacts the upper surface 270 of the carriage 262. The lower flange 216 may have one or more fastener openings 218 therein. The openings 218 may receive a fastener 220, such as a bolt. The bolt may extend through the opening 218. There may be a number of openings 218 in the carriage 262 thus the lower flange 216 may be located anywhere thereon.

The upper flange 214 may extend substantially transverse the lower flange 216. The upper flange 214 may have a slot 222. The slot 222 may extend substantially the length of the upper flange 214. A fastener may extend through the slot 222 and into the lower flange 216. The slot 222 permits the upper flange 214 to be vertically adjusted with respect to the lower flange 216.

A ladder flange 272 may also be attached to the upper surface 270 of the carriage 262. The ladder flange 272 may have a lower portion 274 secured to the upper surface 270. The ladder flange 272 may also have an upper portion 276 extending generally transverse the lower portion 274. The ladder flange 272 is positioned and adapted to prevent a ladder 244, 250 on the system 20, which may include a ladder 250 that does not extend the full length of the system 20, from sliding off a side of the system 20.

In accordance with the provisions of the patent statutes, the system has been described in what is considered to represent its preferred embodiments. However, it should be noted that the system can be practiced otherwise than as specifically illustrated and described without departing from its spirit or scope.

What is claimed is:
1. A ladder rack, comprising:
a first slide assembly adapted to selectively move with respect to a first roof bow, comprising:
first and second slide walls connected together by an intermediate bow slide wall, wherein at least one of a channel bar and a fastener bar are connected to the intermediate bow slide wall by at least one fastener, wherein the at least one fastener is adapted to be slidably received within the first roof bow;
a support flange connected to the second slide wall;
a housing connected to the support flange, wherein a retention tube is rotatably mounted within the housing;
a first gripper member is connected to the retention tube for selective movement therewith;
a second slide assembly adapted to selectively move with respect to a second roof bow, comprising:
first and second slide walls connected together by an intermediate bow slide wall, wherein at least one of a channel bar and a fastener bar are connected to the intermediate bow slide wall by at least one fastener, wherein the at least one fastener is adapted to be slidably received within the second roof bow;
a gripper platform slide connected to the second rail slide wall;
a second gripper member removably connected to the gripper platform slide; and
a side tube having one end portion connected to the support flange and a second end portion connected to the gripper platform slide.

2. The ladder rack of claim 1, further comprising a carriage and a slide tube wherein the carriage is selectively movable along the side tube and the slide tube.

3. The ladder rack of claim 2, wherein the carriage has an upper surface with a side tube housing for receiving the side tube therein and two slide tube housings on a lower surface for receiving the slide tube therein.

4. The ladder rack of claim 3, wherein the upper surface of the carriage is substantially coplanar with an upper surface of the support bar and an upper surface of the gripper platform slide.

5. The assembly of claim 1, wherein the housing comprises substantially parallel first and second legs connected by a transverse upper portion.

6. The assembly of claim 1, wherein the gripper member is attached to a rear surface of a pivot member and the rear surface is attached to the retention tube.

7. A slide assembly for a ladder rack, comprising:
first and second substantially parallel slide walls connected together by an intermediate, transverse bow slide wall, wherein at least one of a channel bar and a fastener bar are connected to the intermediate bow slide wall by at least one fastener, wherein the at least one fastener is adapted to be slidably received within a roof bow;
a support flange connected to the second rail slide wall;
a housing connected to the support flange, wherein a retention tube is rotatably mounted within the housing; and
a gripper member is connected to the retention tube for selective movement therewith.

8. The assembly of claim 7, wherein the channel bar and the fastener bar are rectangular bars, wherein the fastener bar has a smaller width compared to the channel bar and wherein fasteners extend through end portions of both bars and into the intermediate rail slide wall.

9. The assembly of claim 7, wherein the support flange is substantially parallel but not coplanar with the intermediate rail slide wall.

10. The assembly of claim 7, wherein the housing comprises substantially parallel first and second legs connected by a transverse upper portion.

11. The assembly of claim 7, wherein the gripper member is attached to a rear surface of a pivot member and the rear surface is attached to the retention tube.

12. The assembly of claim 7, wherein the retention tube extends substantially parallel at least one of the channel bar and the fastener bar.

13. A ladder rack, comprising:
a first slide assembly, comprising:
first and second slide walls connected together by an intermediate bow slide wall, wherein the walls are adapted to selectively slide along a first roof bow;
a support flange connected to the second slide wall;
a housing connected to the support flange, wherein a retention tube is rotatably mounted within the housing;
a first gripper member is connected to the retention tube for selective movement therewith;
a second slide assembly, comprising:
first and second slide walls connected together by an intermediate bow slide wall, wherein the walls are adapted to selectively slide along a second roof bow;
a gripper platform slide connected to the second slide wall;
a second gripper member removably connected to the gripper platform slide;
a side tube having a first end portion connected to the support flange and a second end portion connected to the gripper platform slide;
a slide tube having a first end portion connected to the support flange and a second end connected to the gripper platform slide; and
a carriage having at least one slide tube housing and a side tube housing wherein the housings slidably receive the slide tube and the side tube therein, wherein the carriage extends between the tubes and selectively moves along the tubes.

14. The ladder rack of claim 13, wherein the side tube and slide tube extend substantially parallel and coplanar one another.

15. The ladder rack of claim 13, wherein a gripper portion and a ladder flange are removably mounted to an upper surface of the carriage.

16. The ladder rack of claim 13, wherein two slide tube housings are located on a lower surface of the carriage and the side tube housing is located on an upper surface of the carriage.

17. The ladder rack of claim 13, wherein an upper surface of the carriage is substantially coplanar with an upper surface of the support bar and an upper surface of the gripper platform slide.

* * * * *